US007334635B2

(12) United States Patent
Nguyen

(10) Patent No.: US 7,334,635 B2
(45) Date of Patent: Feb. 26, 2008

(54) METHODS FOR FRACTURING SUBTERRANEAN WELLS

(75) Inventor: Philip D. Nguyen, Duncan, OK (US)

(73) Assignee: Halliburton Energy Services, Inc., Duncan, OK (US)

(*) Notice: Subject to any disclaimer, the term of this patent is extended or adjusted under 35 U.S.C. 154(b) by 189 days.

(21) Appl. No.: 11/035,833

(22) Filed: Jan. 14, 2005

(65) Prior Publication Data
US 2006/0157243 A1 Jul. 20, 2006

(51) Int. Cl.
E21B 43/267 (2006.01)
(52) U.S. Cl. .................. 166/280.1; 166/280.2
(58) Field of Classification Search ............ 166/280.1, 166/280.2
See application file for complete search history.

(56) References Cited

U.S. PATENT DOCUMENTS

| 2,238,671 | A | 4/1941 | Woodhouse | 166/21 |
|---|---|---|---|---|
| 2,703,316 | A | 3/1955 | Schneider | 260/78.3 |
| 2,869,642 | A | 1/1959 | McKay et al. | |
| 3,047,067 | A | 7/1962 | Williams et al. | 166/33 |
| 3,123,138 | A | 3/1964 | Robichaux | 166/33 |
| 3,176,768 | A | 4/1965 | Brandt et al. | 166/33 |
| 3,199,590 | A | 8/1965 | Young | 166/33 |
| 3,272,650 | A | 9/1966 | MacVittie | 134/7 |
| 3,297,086 | A | 1/1967 | Spain | 166/33 |
| 3,308,885 | A | 3/1967 | Sandiford | 166/33 |
| 3,316,965 | A | 5/1967 | Watanabe | 166/33 |
| 3,336,980 | A | 8/1967 | Rike | 166/295 |
| 3,375,872 | A | 4/1968 | McLaughlin et al. | 166/29 |
| 3,404,735 | A | 10/1968 | Young et al. | 166/33 |
| 3,415,320 | A | 12/1968 | Young | 166/33 |
| 3,492,147 | A | 1/1970 | Young et al. | 117/62.2 |
| 3,659,651 | A | 5/1972 | Graham | 166/280 |
| 3,681,287 | A | 8/1972 | Brown et al. | 260/67 |
| 3,708,013 | A | 1/1973 | Dismuke | 166/276 |
| 3,709,298 | A | 1/1973 | Pramann | 166/276 |
| 3,754,598 | A | 8/1973 | Holloway, Jr. | 166/249 |
| 3,765,804 | A | 10/1973 | Brandon | 417/540 |
| 3,768,564 | A | 10/1973 | Knox et al. | 166/307 |
| 3,784,585 | A | 1/1974 | Schmitt et al. | 260/861 |
| 3,819,525 | A | 6/1974 | Hattenbrun | 252/132 |
| 3,828,854 | A | 8/1974 | Templeton et al. | 166/307 |
| 3,842,911 | A | 10/1974 | Know et al. | 166/307 |
| 3,854,533 | A | 12/1974 | Gurley et al. | 166/276 |
| 3,857,444 | A | 12/1974 | Copeland | 166/276 |
| 3,863,709 | A | 2/1975 | Fitch | 165/1 |
| 3,868,998 | A | 3/1975 | Lybarger et al. | 166/278 |
| 3,888,311 | A | 6/1975 | Cooke, Jr. | 166/280 |
| 3,912,692 | A | 10/1975 | Casey et al. | 260/78.3 |
| 3,948,672 | A | 4/1976 | Harnberger | 106/90 |
| 3,955,993 | A | 5/1976 | Curtice | 106/90 |
| 3,960,736 | A | 6/1976 | Free et al. | 252/8.55 R |
| 4,008,763 | A | 2/1977 | Lowe et al. | 166/253 |
| 4,015,995 | A | 4/1977 | Hess | 106/287 |
| 4,029,148 | A | 6/1977 | Emery | 166/250.1 |
| 4,031,958 | A | 6/1977 | Sandiford et al. | 166/270 |
| 4,042,032 | A | 8/1977 | Anderson | 166/276 |
| 4,070,865 | A | 1/1978 | McLaughlin | 61/36 |
| 4,074,760 | A | 2/1978 | Copeland et al. | 166/276 |
| 4,085,801 | A | 4/1978 | Sifferman | 166/295 |
| 4,127,173 | A | 11/1978 | Watkins et al. | 166/276 |
| 4,169,798 | A | 10/1979 | DeMartino | 252/8.55 R |
| 4,172,066 | A | 10/1979 | Zweigle et al. | 260/29.6 TA |
| 4,245,702 | A | 1/1981 | Haafkens et al. | 166/307 |
| 4,273,187 | A | 6/1981 | Satter et al. | 166/250 |
| 4,291,766 | A | 9/1981 | Davies et al. | 166/276 |
| 4,305,463 | A | 12/1981 | Zakiewicz | 106/245 |
| 4,336,842 | A | 6/1982 | Graham et al. | 166/276 |
| 4,352,674 | A | 10/1982 | Fery | 23/230 |

(Continued)

FOREIGN PATENT DOCUMENTS

CA 2063877 5/2003

(Continued)

OTHER PUBLICATIONS

S. W. Almond, et al., "Factors Affecting Proppant Flowback with Resin Coated Proppants," Society of Petroleum Engineers, Inc., SPE 30096, p. 171-186, 1995.
U.S. Appl. No. 10/383,154, filed Mar. 6, 2003, Nguyen, et al.
U.S. Appl. No. 10/394,898, filed Mar. 21, 2003, Eoff et al.
U.S. Appl. No. 10/408,800, filed Apr. 7, 2003, Nguyen, et al.
U.S. Appl. No. 10/601,407, filed Jun. 23, 2003, Byrd et al.
U.S. Appl. No. 10/603,492, filed Jun. 25, 2003, Nguyen, et al.

(Continued)

Primary Examiner—David Bagnell
Assistant Examiner—Nicole Coy
(74) Attorney, Agent, or Firm—Robert A. Kent; Baker Botts, L.L.P.

(57) ABSTRACT

A method of forming a propped fracture comprising: providing a fracture having a far-well bore area and a near-well bore area; placing first proppant particulates at least partially coated with an adhesive substance; placing a portion of second proppant particulates in the near-well bore area of the fracture so as to form a high porosity propped region in the near-well bore. A method of stimulating a producing interval comprising: hydraulically fracturing to create a fracture having a far-well bore area and a near-well bore area; placing a portion of first proppant particulates at least partially coated with an adhesive substance in the far-well bore area of the fracture; and, placing a portion of second proppant particulates in the near-well bore area of the fracture to form a high porosity propped region in the near-well bore area.

16 Claims, No Drawings

U.S. PATENT DOCUMENTS

| | | | |
|---|---|---|---|
| 4,353,806 A | 10/1982 | Canter et al. | 507/229 |
| 4,387,769 A | 6/1983 | Erbstoesser et al. | 166/295 |
| 4,415,805 A | 11/1983 | Fertl et al. | 250/260 |
| 4,439,489 A | 3/1984 | Johnson et al. | 428/404 |
| 4,443,347 A | 4/1984 | Underdown et al. | 252/8.55 R |
| 4,460,052 A | 7/1984 | Gockel | 175/72 |
| 4,470,915 A | 9/1984 | Conway | 252/8.55 R |
| 4,493,875 A | 1/1985 | Beck et al. | 428/403 |
| 4,494,605 A | 1/1985 | Wiechel et al. | 166/288 |
| 4,498,995 A | 2/1985 | Gockel | 252/8.5 LC |
| 4,501,328 A | 2/1985 | Nichols | 166/288 |
| 4,526,695 A | 7/1985 | Erbstosser et al. | 252/8.55 R |
| 4,527,627 A | 7/1985 | Graham et al. | 166/280 |
| 4,541,489 A | 9/1985 | Wu | 166/312 |
| 4,546,012 A | 10/1985 | Brooks | 427/213 |
| 4,553,596 A | 11/1985 | Graham et al. | 166/295 |
| 4,564,459 A | 1/1986 | Underdown et al. | 252/8.55 R |
| 4,572,803 A | 2/1986 | Yamazoe et al. | 534/16 |
| 4,585,064 A | 4/1986 | Graham et al. | 166/280 |
| 4,649,998 A | 3/1987 | Friedman | 166/294 |
| 4,664,819 A | 5/1987 | Glaze et al. | 252/8.551 |
| 4,665,988 A | 5/1987 | Murphey et al. | 166/295 |
| 4,669,543 A | 6/1987 | Young | 166/276 |
| 4,675,140 A | 6/1987 | Sparks et al. | 264/4.3 |
| 4,683,954 A | 8/1987 | Walker et al. | 166/307 |
| 4,694,905 A | 9/1987 | Armbruster | 166/280 |
| 4,715,967 A | 12/1987 | Bellis | 252/8.551 |
| 4,716,964 A | 1/1988 | Erbstoesser et al. | 166/284 |
| 4,733,729 A | 3/1988 | Copeland | 166/276 |
| 4,739,832 A | 4/1988 | Jennings, Jr. et al. | 166/299 |
| 4,785,884 A | 11/1988 | Armbruster | 166/280 |
| 4,787,453 A | 11/1988 | Hewgill et al. | 166/272.3 |
| 4,789,105 A | 12/1988 | Hosokawa et al. | 241/67 |
| 4,796,701 A | 1/1989 | Hudson et al. | 166/278 |
| 4,797,262 A | 1/1989 | Dewitz | 422/142 |
| 4,800,960 A | 1/1989 | Friedman et al. | 166/276 |
| 4,809,783 A | 3/1989 | Hollenbeck et al. | 166/307 |
| 4,817,721 A | 4/1989 | Pober | 166/295 |
| 4,829,100 A | 5/1989 | Murphey et al. | 523/131 |
| 4,838,352 A | 6/1989 | Oberste-Padtberg et al. | 166/291 |
| 4,842,072 A | 6/1989 | Friedman et al. | 166/295 |
| 4,843,118 A | 6/1989 | Lai et al. | 524/555 |
| 4,848,467 A | 7/1989 | Cantu et al. | 166/281 |
| 4,848,470 A | 7/1989 | Korpics | 166/312 |
| 4,850,430 A | 7/1989 | Copeland et al. | 166/276 |
| 4,886,354 A | 12/1989 | Welch et al. | 356/70 |
| 4,888,240 A | 12/1989 | Graham et al. | 428/403 |
| 4,895,207 A | 1/1990 | Friedman et al. | 166/276 |
| 4,903,770 A | 2/1990 | Friedman et al. | 166/288 |
| 4,934,456 A | 6/1990 | Moradi-Araghi | 166/270 |
| 4,936,385 A | 6/1990 | Weaver et al. | 166/288 |
| 4,942,186 A | 7/1990 | Murphey et al. | 523/131 |
| 4,957,165 A | 9/1990 | Cantu et al. | 166/295 |
| 4,959,432 A | 9/1990 | Fan et al. | 526/287 |
| 4,961,466 A | 10/1990 | Himes et al. | 166/250 |
| 4,969,522 A | 11/1990 | Whitehurst et al. | 166/278 |
| 4,969,523 A | 11/1990 | Martin et al. | 166/278 |
| 4,986,353 A | 1/1991 | Clark et al. | 166/279 |
| 4,986,354 A | 1/1991 | Cantu et al. | 166/279 |
| 4,986,355 A | 1/1991 | Casad et al. | 166/295 |
| 5,030,603 A | 7/1991 | Rumpf et al. | 501/127 |
| 5,049,743 A | 9/1991 | Taylor, III et al. | 250/303 |
| 5,082,056 A | 1/1992 | Tackett, Jr. | 166/295 |
| 5,105,886 A | 4/1992 | Strubhar | 166/280 |
| 5,107,928 A | 4/1992 | Hilterhaus | 166/293 |
| 5,128,390 A | 7/1992 | Murphey et al. | 523/130 |
| 5,135,051 A | 8/1992 | Fracteau et al. | 166/104 |
| 5,142,023 A | 8/1992 | Gruber et al. | 528/354 |
| 5,165,438 A | 11/1992 | Fracteau et al. | 137/1 |
| 5,173,527 A | 12/1992 | Calve | 524/74 |
| 5,178,218 A | 1/1993 | Dees | 166/281 |
| 5,182,051 A | 1/1993 | Bandy et al. | 252/645 |
| 5,199,491 A | 4/1993 | Kutts et al. | 166/276 |
| 5,199,492 A | 4/1993 | Surles et al. | 166/295 |
| 5,211,234 A | 5/1993 | Floyd | 166/276 |
| 5,216,050 A | 6/1993 | Sinclair | 524/108 |
| 5,218,038 A | 6/1993 | Johnson et al. | 524/541 |
| 5,232,955 A | 8/1993 | Caabai et al. | 521/63 |
| 5,232,961 A | 8/1993 | Murphey et al. | 523/414 |
| 5,238,068 A | 8/1993 | Fredickson | 166/307 |
| 5,247,059 A | 9/1993 | Gruber et al. | 528/354 |
| 5,249,628 A | 10/1993 | Surjaatmadja | 166/305 |
| 5,256,729 A | 10/1993 | Kutts et al. | 524/700 |
| 5,273,115 A | 12/1993 | Spafford | 166/281 |
| 5,285,849 A | 2/1994 | Surles et al. | 166/295 |
| 5,293,939 A | 3/1994 | Surles et al. | 166/295 |
| 5,295,542 A | 3/1994 | Cole et al. | 166/278 |
| 5,320,171 A | 6/1994 | Laramay | 166/285 |
| 5,321,062 A | 6/1994 | Landrum et al. | 523/141 |
| 5,325,923 A | 7/1994 | Surjaatmadja et al. | 166/308 |
| 5,330,005 A | 7/1994 | Card et al. | 166/280 |
| 5,332,037 A | 7/1994 | Schmidt et al. | 166/276 |
| 5,335,726 A | 8/1994 | Rodrogues | 166/295 |
| 5,351,754 A | 10/1994 | Hardin et al. | 166/249 |
| 5,358,051 A | 10/1994 | Rodrigues | 166/295 |
| 5,359,026 A | 10/1994 | Gruber | 528/354 |
| 5,360,068 A | 11/1994 | Sprunt et al. | 166/259 |
| 5,361,856 A | 11/1994 | Surjaatmadja et al. | 175/67 |
| 5,363,916 A | 11/1994 | Himes et al. | 166/276 |
| 5,373,901 A | 12/1994 | Norman et al. | 166/300 |
| 5,377,759 A | 1/1995 | Surles | 166/295 |
| 5,381,864 A | 1/1995 | Nguyen et al. | 166/280 |
| 5,386,874 A | 2/1995 | Laramay et al. | 166/300 |
| 5,388,648 A | 2/1995 | Jordan, Jr. | 166/380 |
| 5,393,810 A | 2/1995 | Harris et al. | 524/56 |
| 5,396,957 A | 3/1995 | Surjaatmadja et al. | 166/308 |
| 5,402,846 A | 4/1995 | Jennings, Jr. et al. | 166/259 |
| 5,422,183 A | 6/1995 | Sinclair et al. | 428/403 |
| 5,423,381 A | 6/1995 | Surles et al. | 166/295 |
| 5,439,055 A | 8/1995 | Card et al. | 166/280 |
| 5,460,226 A | 10/1995 | Lawton et al. | 166/300 |
| 5,464,060 A | 11/1995 | Hale et al. | 166/293 |
| 5,475,080 A | 12/1995 | Gruber et al. | 528/354 |
| 5,484,881 A | 1/1996 | Gruber et al. | 528/54 |
| 5,492,178 A | 2/1996 | Nguyen et al. | 166/276 |
| 5,494,103 A | 2/1996 | Surjaatmadja et al. | 166/222 |
| 5,497,830 A | 3/1996 | Boles et al. | 166/300 |
| 5,498,280 A | 3/1996 | Fistner et al. | 106/19 |
| 5,499,678 A | 3/1996 | Surjaatmadja et al. | 166/298 |
| 5,501,275 A | 3/1996 | Card et al. | 166/280 |
| 5,505,787 A | 4/1996 | Yamaguchi | 134/4 |
| 5,512,071 A | 4/1996 | Yam et al. | 51/307 |
| 5,520,250 A | 5/1996 | Harry et al. | 166/278 |
| 5,522,460 A | 6/1996 | Shu | 166/295 |
| 5,529,123 A | 6/1996 | Carpenter et al. | 166/293 |
| 5,531,274 A | 7/1996 | Bienvenu, Jr. | 166/280 |
| 5,536,807 A | 7/1996 | Gruber et al. | 528/354 |
| 5,545,824 A | 8/1996 | Stengel et al. | 524/590 |
| 5,547,023 A | 8/1996 | McDaniel et al. | 166/280 |
| 5,551,513 A | 9/1996 | Suries et al. | 166/278 |
| 5,551,514 A | 9/1996 | Nelson et al. | 166/280 |
| 5,582,249 A | 12/1996 | Caveny et al. | 166/276 |
| 5,582,250 A | 12/1996 | Constein | 166/280 |
| 5,588,488 A | 12/1996 | Vijn et al. | 166/293 |
| 5,591,700 A | 1/1997 | Harris et al. | 507/204 |
| 5,594,095 A | 1/1997 | Gruber et al. | 528/354 |
| 5,595,245 A | 1/1997 | Scott, III | 166/250.1 |
| 5,597,784 A | 1/1997 | Sinclair et al. | 507/219 |
| 5,604,184 A | 2/1997 | Ellis et al. | 507/117 |
| 5,604,186 A | 2/1997 | Hunt et al. | 507/204 |
| 5,609,207 A | 3/1997 | Dewprashad et al. | 166/276 |
| 5,620,049 A | 4/1997 | Gipson et al. | 166/248 |
| 5,639,806 A | 6/1997 | Johnson et al. | 523/208 |

| Patent No. | Date | Inventor | Class |
|---|---|---|---|
| 5,670,473 A | 9/1997 | Scepanski | 510/445 |
| 5,692,566 A | 12/1997 | Surles | 166/295 |
| 5,697,440 A | 12/1997 | Weaver et al. | 166/281 |
| 5,698,322 A | 12/1997 | Tsai et al. | 428/373 |
| 5,712,314 A | 1/1998 | Surles et al. | 521/41 |
| 5,732,364 A | 3/1998 | Kalb et al. | 588/8 |
| 5,765,642 A | 6/1998 | Surjaatmadja | 166/297 |
| 5,775,425 A | 7/1998 | Weaver et al. | 166/276 |
| 5,782,300 A | 7/1998 | James et al. | 166/278 |
| 5,783,822 A | 7/1998 | Buchanan et al. | 250/259 |
| 5,787,986 A | 8/1998 | Weaver et al. | 166/280 |
| 5,791,415 A | 8/1998 | Nguyen et al. | 166/280 |
| 5,799,734 A | 9/1998 | Norman et al. | 166/278 |
| 5,806,593 A | 9/1998 | Suries | 166/270 |
| 5,830,987 A | 11/1998 | Smith | 528/332 |
| 5,833,000 A | 11/1998 | Weaver et al. | 166/276 |
| 5,833,361 A | 11/1998 | Funk | 366/80 |
| 5,836,391 A | 11/1998 | Jonasson et al. | 166/295 |
| 5,836,392 A | 11/1998 | Urlwin-Smith | 166/295 |
| 5,837,656 A | 11/1998 | Sinclair et al. | 507/220 |
| 5,837,785 A | 11/1998 | Kinsho et al. | 525/527 |
| 5,839,510 A | 11/1998 | Weaver et al. | 166/276 |
| 5,840,784 A | 11/1998 | Funkhouser et al. | 523/130 |
| 5,849,401 A | 12/1998 | El-Afandi et al. | 428/215 |
| 5,849,590 A | 12/1998 | Anderson, II et al. | 436/27 |
| 5,853,048 A | 12/1998 | Weaver et al. | 166/279 |
| 5,864,003 A | 1/1999 | Qureshi et al. | 528/141 |
| 5,865,936 A | 2/1999 | Edelman et al. | 156/310 |
| 5,871,049 A | 2/1999 | Weaver et al. | 166/276 |
| 5,873,413 A | 2/1999 | Chatterji et al. | 166/293 |
| 5,875,844 A | 3/1999 | Chatterji et al. | 166/293 |
| 5,875,845 A | 3/1999 | Chatterji et al. | 166/293 |
| 5,875,846 A | 3/1999 | Chatterji et al. | 166/293 |
| 5,893,383 A | 4/1999 | Fracteau | 137/14 |
| 5,893,416 A | 4/1999 | Read | 166/304 |
| 5,908,073 A | 6/1999 | Nguyen et al. | 166/276 |
| 5,911,282 A | 6/1999 | Onan et al. | 175/72 |
| 5,916,933 A | 6/1999 | Johnson et al. | 523/208 |
| 5,921,317 A | 7/1999 | Dewprashad et al. | 166/208 |
| 5,924,488 A | 7/1999 | Nguyen et al. | 166/280 |
| 5,929,437 A | 7/1999 | Elliott et al. | 250/259 |
| 5,944,105 A | 8/1999 | Nguyen | 166/278 |
| 5,945,387 A | 8/1999 | Chatterji et al. | 507/224 |
| 5,948,734 A | 9/1999 | Sinclair et al. | 507/219 |
| 5,957,204 A | 9/1999 | Chatterji et al. | 166/295 |
| 5,960,877 A | 10/1999 | Funkhouser et al. | 166/270 |
| 5,960,880 A | 10/1999 | Nguyen et al. | 166/280 |
| 5,964,291 A | 10/1999 | Bourne et al. | 166/279 |
| 5,969,006 A | 10/1999 | Onan et al. | 523/166 |
| 5,977,283 A | 11/1999 | Rossitto | 528/44 |
| 5,994,785 A | 11/1999 | Higuchi et al. | 527/789 |
| RE36,466 E | 12/1999 | Nelson et al. | 166/280 |
| 6,003,600 A | 12/1999 | Nguyen et al. | 166/281 |
| 6,004,400 A | 12/1999 | Bishop et al. | 134/2 |
| 6,006,835 A | 12/1999 | Onan et al. | 166/295 |
| 6,006,836 A | 12/1999 | Chatterji et al. | 166/295 |
| 6,012,524 A | 1/2000 | Chatterji et al. | 166/295 |
| 6,016,870 A | 1/2000 | Dewprashad et al. | 166/295 |
| 6,024,170 A | 2/2000 | McCabe et al. | 166/300 |
| 6,028,113 A | 2/2000 | Scepanski | 514/643 |
| 6,028,534 A | 2/2000 | Ciglenec et al. | 340/856.2 |
| 6,040,398 A | 3/2000 | Kinsho et al. | 525/527 |
| 6,047,772 A | 4/2000 | Weaver et al. | 166/276 |
| 6,059,034 A | 5/2000 | Rickards et al. | 166/280 |
| 6,059,035 A | 5/2000 | Chatterji et al. | 166/293 |
| 6,059,036 A | 5/2000 | Chatterji et al. | 166/294 |
| 6,068,055 A | 5/2000 | Chatterji et al. | 166/293 |
| 6,069,117 A | 5/2000 | Onan et al. | 507/202 |
| 6,074,739 A | 6/2000 | Katagiri | 428/323 |
| 6,079,492 A | 6/2000 | Hoogteijling et al. | 166/276 |
| 6,098,711 A | 8/2000 | Chatterji et al. | 166/294 |
| 6,114,410 A | 9/2000 | Betzold | 523/130 |
| 6,123,871 A | 9/2000 | Carroll | 252/301.36 |
| 6,123,965 A | 9/2000 | Jacon et al. | 424/489 |
| 6,124,246 A | 9/2000 | Heathman et al. | 507/219 |
| 6,130,286 A | 10/2000 | Thomas et al. | 524/507 |
| 6,135,987 A | 10/2000 | Tsai et al. | 604/365 |
| 6,140,446 A | 10/2000 | Fujiki et al. | 528/15 |
| 6,148,911 A | 11/2000 | Gipson et al. | 166/248 |
| 6,152,234 A | 11/2000 | Newhouse et al. | 166/403 |
| 6,162,766 A | 12/2000 | Muir et al. | 507/267 |
| 6,169,058 B1 | 1/2001 | Le et al. | 507/222 |
| 6,172,011 B1 | 1/2001 | Card et al. | 507/204 |
| 6,172,077 B1 | 1/2001 | Curtis et al. | 514/278 |
| 6,176,315 B1 | 1/2001 | Reddy et al. | 166/295 |
| 6,177,484 B1 | 1/2001 | Surles | 523/131 |
| 6,184,311 B1 | 2/2001 | O'Keefe et al. | 525/438 |
| 6,187,834 B1 | 2/2001 | Thayer et al. | 522/15 |
| 6,187,839 B1 | 2/2001 | Eoff et al. | 523/130 |
| 6,189,615 B1 | 2/2001 | Sydansk | 166/270 |
| 6,192,985 B1 | 2/2001 | Hinkel et al. | 166/280 |
| 6,192,986 B1 | 2/2001 | Urlwin-Smith | 166/295 |
| 6,196,317 B1 | 3/2001 | Hardy | 166/295 |
| 6,202,751 B1 | 3/2001 | Chatterji et al. | 166/276 |
| 6,209,643 B1 | 4/2001 | Nguyen et al. | 166/276 |
| 6,209,644 B1 | 4/2001 | Brunet | 166/297 |
| 6,209,646 B1 | 4/2001 | Reddy et al. | 166/300 |
| 6,210,471 B1 | 4/2001 | Craig | 106/31.08 |
| 6,214,773 B1 | 4/2001 | Harris et al. | 507/271 |
| 6,231,664 B1 | 5/2001 | Chatterji et al. | 106/724 |
| 6,234,251 B1 | 5/2001 | Chatterji et al. | 166/295 |
| 6,238,597 B1 | 5/2001 | Yim et al. | 252/512 |
| 6,241,019 B1 | 6/2001 | Davidson et al. | 166/249 |
| 6,242,390 B1 | 6/2001 | Mitchell et al. | 507/211 |
| 6,244,344 B1 | 6/2001 | Chatterji et al. | 166/295 |
| 6,257,335 B1 | 7/2001 | Nguyen et al. | 166/280 |
| 6,260,622 B1 | 7/2001 | Blok et al. | 166/305.1 |
| 6,271,181 B1 | 8/2001 | Chatterji et al. | 507/219 |
| 6,274,650 B1 | 8/2001 | Cui | 523/457 |
| 6,279,652 B1 | 8/2001 | Chatterji et al. | 166/194 |
| 6,279,656 B1 | 8/2001 | Sinclair et al. | 166/310 |
| 6,283,214 B1 | 9/2001 | Guinot et al. | 166/297 |
| 6,302,207 B1 | 10/2001 | Nguyen et al. | 166/276 |
| 6,306,998 B1 | 10/2001 | Kimura et al. | 528/12 |
| 6,311,773 B1 | 11/2001 | Todd et al. | 166/280 |
| 6,321,841 B1 | 11/2001 | Eoff et al. | 166/291 |
| 6,323,307 B1 | 11/2001 | Bigg et al. | 528/354 |
| 6,326,458 B1 | 12/2001 | Gruber et al. | 528/354 |
| 6,328,105 B1 | 12/2001 | Betzold | 166/280 |
| 6,328,106 B1 | 12/2001 | Griffith et al. | 166/295 |
| 6,330,916 B1 | 12/2001 | Rickards et al. | 166/280 |
| 6,330,917 B2 | 12/2001 | Chatterji et al. | 166/295 |
| 6,350,309 B2 | 2/2002 | Chatterji et al. | 106/677 |
| 6,357,527 B1 | 3/2002 | Norman et al. | 166/300 |
| 6,364,018 B1 | 4/2002 | Brannon et al. | 166/280.2 |
| 6,364,945 B1 | 4/2002 | Chatterji et al. | 106/677 |
| 6,367,165 B1 | 4/2002 | Huttlin | 34/582 |
| 6,367,549 B1 | 4/2002 | Chatterji et al. | 166/292 |
| 6,372,678 B1 | 4/2002 | Youngsman et al. | 504/128 |
| 6,376,571 B1 | 4/2002 | Chawla et al. | 522/64 |
| 6,387,986 B1 | 5/2002 | Moradi-Araghi et al. | 523/211 |
| 6,390,195 B1 | 5/2002 | Nguyen et al. | 166/276 |
| 6,401,817 B1 | 6/2002 | Griffith et al. | 166/295 |
| 6,405,797 B2 | 6/2002 | Davidson et al. | 166/249 |
| 6,406,789 B1 | 6/2002 | McDaniel et al. | 428/403 |
| 6,408,943 B1 | 6/2002 | Schultz et al. | 166/285 |
| 6,422,314 B1 | 7/2002 | Todd et al. | 166/312 |
| 6,439,309 B1 | 8/2002 | Matherly et al. | 166/276 |
| 6,439,310 B1 | 8/2002 | Scott, III et al. | 166/308 |
| 6,440,255 B1 | 8/2002 | Kohlhammer et al. | 156/283 |
| 6,446,727 B1 | 9/2002 | Zemlak et al. | 166/308 |
| 6,448,206 B1 | 9/2002 | Griffith et al. | 507/219 |
| 6,450,260 B1 | 9/2002 | James et al. | 166/277 |
| 6,454,003 B1 | 9/2002 | Chang et al. | 166/270 |
| 6,458,885 B1 | 10/2002 | Stengal et al. | 524/507 |
| 6,485,947 B1 | 11/2002 | Rajgarhia et al. | 435/139 |

| | | | | | | | |
|---|---|---|---|---|---|---|---|
| 6,488,091 | B1 | 12/2002 | Weaver et al. ............... 166/300 | 2004/0048752 | A1 | 3/2004 | Nguyen et al. .............. 507/269 |
| 6,488,763 | B2 | 12/2002 | Brothers et al. ............. 106/692 | 2004/0055747 | A1 | 3/2004 | Lee ............................ 166/278 |
| 6,494,263 | B2 | 12/2002 | Todd ......................... 166/312 | 2004/0106525 | A1 | 6/2004 | Wilbert et al. .............. 507/200 |
| 6,503,870 | B2 | 1/2003 | Griffith et al. ............... 507/219 | 2004/0138068 | A1 | 7/2004 | Rimmer et al. .............. 507/100 |
| 6,508,305 | B1 | 1/2003 | Brannon et al. ............. 166/293 | 2004/0149441 | A1 | 8/2004 | Nguyen et al. ........... 166/280.1 |
| 6,527,051 | B1 | 3/2003 | Reddy et al. ............... 166/300 | 2004/0152601 | A1 | 8/2004 | Still et al. .................... 507/100 |
| 6,528,157 | B1 | 3/2003 | Hussain et al. ............. 428/325 | 2004/0177961 | A1 | 9/2004 | Nguyen et al. ........... 166/280.2 |
| 6,531,427 | B1 | 3/2003 | Shuchart et al. ............ 507/267 | 2004/0194961 | A1 | 10/2004 | Nguyen et al. .............. 166/295 |
| 6,538,576 | B1 | 3/2003 | Schultz et al. ............ 340/859.6 | 2004/0206499 | A1 | 10/2004 | Nguyen et al. ........... 166/280.2 |
| 6,543,545 | B1 | 4/2003 | Chatterji et al. ............. 166/381 | 2004/0211559 | A1 | 10/2004 | Nguyen et al. .............. 166/276 |
| 6,552,333 | B1 | 4/2003 | Storm et al. ............. 250/269.3 | 2004/0211561 | A1 | 10/2004 | Nguyen et al. ........... 166/280.2 |
| 6,554,071 | B1 | 4/2003 | Reddy et al. ............... 166/293 | 2004/0221992 | A1 | 11/2004 | Nguyen et al. .............. 166/295 |
| 6,555,507 | B2 | 4/2003 | Chatterji et al. ............. 507/219 | 2004/0231845 | A1 | 11/2004 | Cooke, Jr. .................. 166/279 |
| 6,569,814 | B1 | 5/2003 | Brady et al. ................. 507/201 | 2004/0231847 | A1 | 11/2004 | Nguyen et al. .............. 166/295 |
| 6,582,819 | B2 | 6/2003 | McDaniel et al. ........... 428/402 | 2004/0256099 | A1 | 12/2004 | Nguyen et al. .............. 166/249 |
| 6,593,402 | B2 | 7/2003 | Chatterji et al. ................. 524/7 | 2004/0261995 | A1 | 12/2004 | Nguyen et al. .............. 166/279 |
| 6,599,863 | B1 | 7/2003 | Palmer et al. ............... 507/219 | 2004/0261997 | A1 | 12/2004 | Nguyen et al. .............. 166/281 |
| 6,608,162 | B1 | 8/2003 | Chiu et al. ................... 528/129 | 2005/0000731 | A1 | 1/2005 | Nguyen et al. ............... 175/57 |
| 6,616,320 | B2 | 9/2003 | Huber et al. ............... 366/156.2 | 2005/0006093 | A1 | 1/2005 | Nguyen et al. .............. 166/281 |
| 6,620,857 | B2 | 9/2003 | Valet ........................... 522/42 | 2005/0006095 | A1 | 1/2005 | Justus et al. ................. 166/295 |
| 6,626,241 | B2 | 9/2003 | Nguyen ....................... 166/278 | 2005/0006096 | A1 | 1/2005 | Nguyen et al. .............. 166/295 |
| 6,632,527 | B1 | 10/2003 | McDaniel et al. ........... 428/402 | 2005/0034862 | A1 | 2/2005 | Nguyen et al. .............. 166/281 |
| 6,632,778 | B1 | 10/2003 | Ayoub et al. ................ 507/202 | 2005/0045326 | A1 | 3/2005 | Nguyen ....................... 166/278 |
| 6,632,892 | B2 | 10/2003 | Rubinsztajn et al. ........ 525/476 | 2005/0051331 | A1 | 3/2005 | Nguyen et al. ........... 166/280.2 |
| 6,642,309 | B2 | 11/2003 | Komitsu et al. ............. 525/100 | 2006/0048943 | A1* | 3/2006 | Parker et al. ............. 166/308.1 |
| 6,648,501 | B2 | 11/2003 | Huber et al. ................. 366/301 | 2006/0113078 | A1* | 6/2006 | Nguyen et al. ........... 166/280.2 |
| 6,659,179 | B2 | 12/2003 | Nguyen ....................... 166/227 | | | | |
| 6,664,343 | B2 | 12/2003 | Narisawa et al. ............ 525/474 | | | | |
| 6,667,279 | B1 | 12/2003 | Hessert et al. ............... 507/225 | | | | |

FOREIGN PATENT DOCUMENTS

| | | |
|---|---|---|
| EP | 0313243 B1 | 10/1988 |
| EP | 0528595 A1 | 8/1992 |
| EP | 0510762 A2 | 11/1992 |
| EP | 0643196 A2 | 6/1994 |
| EP | 0834644 A2 | 4/1998 |
| EP | 0853186 A2 | 7/1998 |
| EP | 0864726 A2 | 9/1998 |
| EP | 0879935 B1 | 11/1998 |
| EP | 0933498 A1 | 8/1999 |
| EP | 1001133 A1 | 5/2000 |
| EP | 1132569 A2 | 9/2001 |
| EP | 1326003 A1 | 7/2003 |
| EP | 1362978 A1 | 11/2003 |
| EP | 1394355 A1 | 3/2004 |
| EP | 1396606 A2 | 3/2004 |
| EP | 1398640 A1 | 3/2004 |
| EP | 1403466 A2 | 3/2004 |
| EP | 1464789 A1 | 10/2004 |
| GB | 1107584 | 3/1968 |
| GB | 1264180 | 12/1969 |
| GB | 1292718 | 10/1972 |
| GB | 2382143 A | 4/2001 |
| WO | WO 93/15127 | 8/1993 |
| WO | WO 94/07949 | 4/1994 |
| WO | WO 94/08078 | 4/1994 |
| WO | WO 94/08090 | 4/1994 |
| WO | WO 95/09879 | 4/1995 |
| WO | WO 97/11845 | 4/1997 |
| WO | WO 99/27229 | 6/1999 |
| WO | WO 01/81914 | 11/2001 |
| WO | WO 01/87797 A1 | 11/2001 |
| WO | WO 02/12674 A1 | 2/2002 |
| WO | WO 03/027431 A1 | 4/2003 |
| WO | WO 2004/037946 A1 | 5/2004 |
| WO | WO 2004/038176 A1 | 5/2004 |
| WO | WO 2004/083600 * | 9/2004 |
| WO | WO 2005/021928 A2 | 3/2005 |

| | | | |
|---|---|---|---|
| 6,668,926 | B2 | 12/2003 | Nguyen et al. .............. 166/280 |
| 6,669,771 | B2 | 12/2003 | Tokiwa et al. ............. 106/162.7 |
| 6,681,856 | B1 | 1/2004 | Chatterji et al. ............. 166/294 |
| 6,686,328 | B1 | 2/2004 | Binder ......................... 510/446 |
| 6,705,400 | B1 | 3/2004 | Nugyen et al. .............. 166/281 |
| 6,710,019 | B1 | 3/2004 | Sawdon et al. ............. 507/136 |
| 6,713,170 | B1 | 3/2004 | Kaneka et al. .............. 428/323 |
| 6,725,926 | B2 | 4/2004 | Nguyen et al. ............ 166/254.1 |
| 6,725,931 | B2 | 4/2004 | Nguyen et al. ........... 166/280.2 |
| 6,729,404 | B2 | 5/2004 | Nguyen et al. ........... 166/280.2 |
| 6,732,800 | B2 | 5/2004 | Acock et al. ................ 166/308 |
| 6,745,159 | B1 | 6/2004 | Todd et al. .................... 703/10 |
| 6,749,025 | B1 | 6/2004 | Brannon et al. ........... 166/305.1 |
| 6,763,888 | B1 | 7/2004 | Harris et al. .............. 166/305.1 |
| 6,766,858 | B2 | 7/2004 | Nguyen et al. .............. 166/300 |
| 6,776,236 | B1 | 8/2004 | Nguyen ....................... 166/279 |
| 6,832,650 | B2 | 12/2004 | Nguyen et al. .............. 166/279 |
| 6,851,474 | B2 | 2/2005 | Nguyen ....................... 166/279 |
| 6,887,834 | B2 | 5/2005 | Nguyen et al. .............. 507/221 |
| 6,978,836 | B2 | 12/2005 | Nguyen et al. .............. 166/295 |
| 7,093,658 | B2* | 8/2006 | Chatterji et al. ............. 166/293 |
| 2001/0016562 | A1 | 8/2001 | Muir et al. ................... 507/201 |
| 2002/0043370 | A1 | 4/2002 | Poe ......................... 166/250.07 |
| 2002/0048676 | A1 | 4/2002 | McDaniel et al. ........... 428/404 |
| 2002/0070020 | A1 | 6/2002 | Nguyen ....................... 166/295 |
| 2003/0006036 | A1 | 1/2003 | Malone et al. ........... 166/250.12 |
| 2003/0060374 | A1 | 3/2003 | Cooke, Jr. .................. 507/200 |
| 2003/0114314 | A1 | 6/2003 | Ballard et al. ............... 507/100 |
| 2003/0130133 | A1 | 7/2003 | Vollmer ....................... 507/100 |
| 2003/0131999 | A1 | 7/2003 | Nguyen et al. .............. 166/280 |
| 2003/0148893 | A1 | 8/2003 | Lungofer et al. ............ 507/200 |
| 2003/0186820 | A1 | 10/2003 | Thesing ....................... 507/200 |
| 2003/0188766 | A1 | 10/2003 | Banerjee et al. ................ 134/7 |
| 2003/0188872 | A1 | 10/2003 | Nguyen et al. .............. 166/308 |
| 2003/0196805 | A1 | 10/2003 | Boney et al. ................ 166/280 |
| 2003/0205376 | A1 | 11/2003 | Ayoub et al. ............. 166/254.2 |
| 2003/0230408 | A1 | 12/2003 | Acock et al. ................ 166/297 |
| 2003/0234103 | A1 | 12/2003 | Lee et al. .................... 166/293 |
| 2004/0000402 | A1 | 1/2004 | Nguyen et al. .............. 166/280 |
| 2004/0014607 | A1 | 1/2004 | Sinclair et al. .............. 507/200 |
| 2004/0014608 | A1 | 1/2004 | Nguyen et al. .............. 507/100 |
| 2004/0040706 | A1 | 3/2004 | Hossaini et al. ............. 166/278 |
| 2004/0040708 | A1 | 3/2004 | Stephenson et al. ..... 166/280.1 |
| 2004/0040713 | A1 | 3/2004 | Nguyen et al. .............. 166/295 |

OTHER PUBLICATIONS

U.S. Appl. No. 10/649,029, filed Aug. 27, 2003, Nguyen, et al.
U.S. Appl. No. 10/650,063, filed Aug. 26, 2003, Nguyen.
U.S. Appl. No. 10/650,064, filed Aug. 26, 2003, Nguyen, et al.
U.S. Appl. No. 10/650,065, filed Aug. 26, 2003, Nguyen.
U.S. Appl. No. 10/659,574, filed Sep. 10, 2003, Nguyen, et al.

U.S. Appl. No. 10/727,365, filed Dec. 4, 2003, Reddy, et al.
U.S. Appl. No. 10/751,593, filed Jan. 5, 2004, Nguyen.
U.S. Appl. No. 10/775,347, filed Feb. 10, 2004, Nguyen.
U.S. Appl. No. 10/791,944, filed Mar. 3, 2004, Nguyen.
U.S. Appl. No. 10/793,711, filed Mar. 5, 2004, Nguyen, et al.
U.S. Appl. No. 10/852,811, filed May 25, 2004, Nguyen.
U.S. Appl. No. 10/853,879, filed May 26, 2004, Nguyen et al.
U.S. Appl. No. 10/860,951, filed Jun. 4, 2004, Stegent, et al.
U.S. Appl. No. 10/861,829, filed Jun. 4, 2004, Stegent, et al.
U.S. Appl. No. 10/862,986, filed Jun. 8, 2004, Nguyen, et al.
U.S. Appl. No. 10/864,061, filed Jun. 9, 2004, Blauch, et al.
U.S. Appl. No. 10/864,618, filed Jun. 9, 2004, Blauch, et al.
U.S. Appl. No. 10/868,593, filed Jun. 15, 2004, Nguyen, et al.
U.S. Appl. No. 10/868,608, filed Jun. 15, 2004, Nguyen, et al.
U.S. Appl. No. 10/944,973, filed Sep. 20, 2004, Nguyen, et al.
U.S. Appl. No. 10/972,648, filed Oct. 25, 2004, Dusterhoft, et al.
U.S. Appl. No. 10/977,673, filed Oct. 29, 2004, Nguyen.
U.S. Appl. No. 11/009,277, filed Dec. 8, 2004, Welton, et al.
U.S. Appl. No. 11/011,394, filed Dec. 12, 2004, Nguyen, et al.
U.S. Appl. No. 11/035,833, filed Jan. 14, 2005, Nguyen.
U.S. Appl. No. 11/049,252, filed Feb. 2, 2005, Van Batenburg, et al.
U.S. Appl. No. 11/053,280, filed Feb. 8, 2005, Nguyen.
U.S. Appl. No. 11/056,635, filed Feb. 11, 2005, Dusterhoft, et al.
Halliburton, *CoalStim$^{SM}$ Service, Helps Boost Cash Flow From CBM Assets*, Stimulation, HO3679 Oct. 2003, Halliburton Communications.
Halliburton, *Conductivity Endurance Technology For High Permeability Reservoirs, Helps Prevent Intrusion of Formation Material Into the Proppant Pack for Improved Long-term Production*, Stimulation, 2003, Halliburton Communications.
Halliburton, *SandWedge® NT Conductivity Enhancement System, Enhances Proppant Pack Conductivity and Helps Prevent Intrusion of Formation Material for Improved Long-Term Production*, Stimulation, HO2289 May 4, 2004, Halliburton Communications.
Halliburton Technical Flier—Multi Stage Frac Completion Methods, 2 pages.
Halliburton "*CobraFrac$^{SM}$ Service, Coiled Tubing Fracturing—Cost-Effective Method for Stimulating Untapped Reserves*", 2 pages, 2004.
Halliburton "*CobraJetFrac$^{SM}$ Service, Cost-Effective Technology That Can Help Reduce Cost per BOE Produced, Shorten Cycle time and Reduce Capex*".
Halliburton Cobra Frac Advertisement, 2001.
Halliburton "*SurgiFrac$^{SM}$ Service, a Quick and cost-Effective Method to Help Boost Production From Openhole Horizonal Completions*", 2002.
Halliburton, *SandWedge® NT Conductivity Enhancement System, Enhances Proppant Pack Conductivity and Helps Prevent Intrusion of Formation Material for Improved Long-Term Production*, Stimulation, HO2289 May 4, Halliburton Communications, 2004.
Nguyen et al., *A Novel Approach For Enhancing Proppant Consolidation: Laboratory Testing And Field Applications*, SPE Paper No. 77748, 2002.
SPE 15547, *Field Application of Lignosulfonate Gels To Reduce Channeling*, South Swan Hills Miscible Unit, Alberta, Canada, by O.R. Wagner et al., 1986.
Owens et al., *Waterflood Pressure Pulsing for Fractured Reservoirs* SPE 1123, 1966.
Felsenthal et al., *Pressure Pulsing—An Improved Method of Waterflooding Fractured Reservoirs* SPE 1788, 1957.
Raza, "*Water and Gas Cyclic Pulsing Method for Improved Oil Recovery*", SPE 3005, 1971.
Peng et al., "*Pressure Pulsing Waterflooding in Dual Porosity Naturally Fractured Reservoirs*" SPE 17587, 1988.
Dusseault et al, "*Pressure Pulse Workovers in Heavy Oil*", SPE 79033, 2002.
Yang et al., "*Experimental Study on Fracture Initiation By Pressure Pulse*", SPE 63035, 2000.
Nguyen et al., *New Guidelines For Applying Curable Resin-Coated Proppants*, SPE Paper No. 39582, 1997.
Kazakov et al., "*Optimizing and Managing Coiled Tubing Frac Strings*" SPE 60747, 2000.
Advances in Polymer Science, vol. 157, "*Degradable Aliphatic Polyesters*" edited by A.-C. Alberston, 2001.
Gorman, *Plastic Electric: Lining up the Future of Conducting Polymers* Science News, vol. 163, May 17, 2003.
Simmons et al., "*Poly(phenyllactide): Synthesis, Characterization, and Hydrolytic Degradation, Biomacromolecules*", vol. 2, No. 2, pp. 658-663, 2001.
Yin et al., "*Preparation and Characterization of Substituted Polylactides*", Americal Chemical Society, vol. 32, No. 23, pp. 7711-7718, 1999.
Yin et al., "*Synthesis and Properties of Polymers Derived from Substituted Lactic Acids*", American Chemical Society, Ch. 12, pp. 147-159, 2001.
Cantu et al., "*Laboratory and Field Evaluation of a Combined Fluid-Loss Control Additive and Gel Breaker for Fracturing Fluids*," SPE 18211, 1990.
Love et al., "*Selectively Placing Many Fractures in Openhole Horizontal Wells Improves Production*", SPE 50422, 1998.
McDaniel et al. "*Evolving New Stimulation Process Proves Highly Effective In Level 1 Dual-Lateral Completion*" SPE 78697, 2002.
Albertsson et al., "*Aliphatic Polyesters: Synthesis, Properties and Application*", Advances in Polymer Science, vol. 57 Degradable Aliphatic Polyesters, 2002.
Dechy-Cabaret et al., "*Controlled Ring-Operated Polymerization of Lactide and Glycolide*" American Chemical Society, Chemical Reviews, A-Z, AA-AD, 2004.
Funkhouser et al., "*Synthetic Polymer Fracturing Fluid For High-Temperature Applications*", SPE 80236, 2003.
*Chelating Agents*, Encyclopedia of Chemical Technology, vol. 5 (764-795).
Vichaibun et al., "*A New Assay for the Enzymatic Degradation of Polyactic Acid, Short Report*", Science Asia, vol. 29, pp. 297-300, 2003.
CDX Gas, CDX Solution, 2003, CDX, LLC, Available @ www.cdxgas.com/solution.html, printed pp. 1-2.
CDX Gas, "*What is Coalbed Methane?*" CDX, LLC. Available @ www.cdxgas.com/what.html, printed p. 1.
Haliburton brochure entitled "H2Zero™ Service Introducing The Next Generation of cost-Effective Conformance Control Solutions", 2002.
Halliburton brochure entitled INJECTROL® A Component: 1999.
Halliburton brochure entitled "INJECTROL® G Sealant", 1999.
Halliburton brochure entitled "INJECTROL® It Sealant", 1999.
Halliburton brochure entitled "INJECTROL® Service Treatment", 1999.
Halliburton brochure entitled "INJECTROL® U Sealant", 1999.
Halliburton brochure entitled "Sanfix® A Resin", 1999.
Halliburton brochure entitled "Pillar Frac Stimulation Technique" Fracturing Services Technical Data Sheet, 2 pages.
Foreign search report and opinion (CPW 21582 EP), Mar. 11, 2005.
U.S. Appl. No. 10/937,076, filed Sep. 9, 2004, Nguyen, et al.
Gidley, et al., "Recent Advances in Hydraulic Fracturing," 1989, Society of Petroleum Engineers, Chapter 6, pp. 109-130.

* cited by examiner

METHODS FOR FRACTURING SUBTERRANEAN WELLS

BACKGROUND

The present invention relates to methods of forming propped fractures in portions of subterranean formations. Producing wells (such as hydrocarbon producing wells and water producing wells) are often stimulated by hydraulic fracturing treatments. In hydraulic fracturing treatments, a viscous fracturing fluid, which also functions as a carrier fluid, is pumped into a portion of a subterranean formation at a rate and pressure such that the subterranean formation breaks down and one or more fractures are formed. Typically, particulate solids, such as graded sand, are suspended in a portion of the fracturing fluid are then deposited in the fractures. These particulate solids, or "proppant particulates," serve to prevent the fractures from fully closing once the hydraulic pressure is released. By keeping the fracture from fully closing, the proppant particulates aid in forming conductive paths through which fluids may flow.

Commonly used proppant particulates generally comprise substantially spherical particles, such as graded sand, bauxite, ceramics, or even nut hulls. Generally, the proppant particulates are placed in the fracture in a concentration such that they formed a tight pack of particulates. Unfortunately, in such traditional operations, when fractures close upon the proppant particulates the particulates may crush or become compacted, potentially forming non-permeable or low-permeability masses within the fracture rather than desirable high-permeability masses; such low-permeability masses may choke the flow path of the fluids within the formation. Furthermore, the proppant particulates may become embedded in particularly soft formations, negatively impacting production.

The degree of success of a fracturing operation depends, at least in part, upon fracture porosity and conductivity once the fracturing operation is stopped and production is begun. Traditional fracturing operations place a large volume of proppant particulates into a fracture and the porosity of the resultant proppant packed fracture is then related to the interconnected interstitial spaces between the abutting proppant particulates. Thus, the resultant fracture porosity from a traditional fracturing operation is closely related to the strength of the placed proppant particulates (if the placed particulates crush then the pieces of broken proppant may plug the interstitial spaces) and the size and shape of the placed particulate (larger, more spherical proppant particulates generally yield increased interstitial spaces between the particulates).

One way proposed to combat problems inherent in tight proppant particulate packs involves placing a much reduced volume of proppant particulates in a fracture to create a high porosity pack of proppant particulates, such a pack may be referred to as a partial monolayer. In partial monolayers, the proppant particulates within the fracture may be widely spaced, but they are still sufficient to hold the fracture open and allow for production. Partial monolayers may allow for increased fracture conductivity due, at least in part, to the fact the produced fluids may flow around widely spaced proppant particulates rather than just through the relatively small interstitial spaces in a traditional packed proppant particulate bed.

While the concept of partial monolayers for use in fracturing has been investigated in the industry, the concept has not been successfully applied for a number of reasons. One problem is that successful placement of a partial monolayer of proppant particulates presents unique challenges in the relative densities of the particulates versus the carrier fluid. Another problem lies in the fact that placing a proppant that tends to crush or embed under pressure may allow the fracture to pinch or close in places once the fracturing pressure is released. Yet another problem is that the particulates may tend to space unevenly or space individually rather than in aggregates, and thus they create thinner or smaller than desired fracture once the fracturing pressure is released.

SUMMARY

The present invention relates to methods of forming propped fractures in portions of subterranean formations.

One embodiment of the present invention provides a method of forming a propped fracture comprising: providing a fracture in a portion of a subterranean formation having a far-well bore area and a near-well bore area; placing a portion of first proppant particulates at least partially coated with an adhesive substance in the far-well bore area of the fracture; and, placing a portion of second proppant particulates in the near-well bore area of the fracture so as to form a high porosity propped region in the near-well bore area.

Another embodiment of the present invention provides a method of stimulating a producing interval comprising: hydraulically fracturing in a portion of a subterranean formation to create a fracture having a far-well bore area and a near-well bore area; placing a portion of first proppant particulates at least partially coated with an adhesive substance in the far-well bore area of the fracture; and, placing a portion of second proppant particulates in the near-well bore area of the fracture so as to form a high porosity propped region in the near-well bore area.

The features and advantages of the present invention will be readily apparent to those skilled in the art upon a reading of the description of the embodiments that follows.

DESCRIPTION

The present invention relates to methods of forming propped fractures in portions of subterranean formations. In general, the methods of the present invention involve placing proppant particulates into one or more fractures of a subterranean formation to form a conductive propped fracture. The methods of the present invention involve at least two types of proppant particulates. The first proppant particulate used in the methods of the present invention comprises a proppant particulate that is at least partially coated with an adhesive substance. Proppant particulates coated with an adhesive substance have a tendency to consolidate in the fracture, thereby reducing the flow-back of proppant and other particulates during production. The first proppant particulate is placed in the far-well bore portion of a fracture. The term "far-well bore" refers to the portion of a fracture that is distal to the well bore and proximate to the fracture tip. The term "adhesive substance" refers to a material that is capable of being coated onto a proppant particulate and that exhibits a sticky or tacky character (such as a resin or tackifier) such that the proppant particulates that have adhesive thereon have a tendency to create clusters or aggregates. The term "tacky," in all of its forms, generally refers to a substance having a nature such that it is (or may be activated to become) somewhat sticky to the touch.

The second proppant particulate used in the methods of the present invention should be capable of forming a partial monolayer in a fracture. The term "partial monolayer" refers to a high porosity pack of proppant particulates in a fracture, in which the proppant particulates are widely spaced but are still capable of holding the fracture open. In some embodiments of the present invention, the term "high porosity" refers to porosities greater than about 40%. In other embodiments of the present invention, the term "high porosity" refers to porosities greater than about 43%. In other embodiments of the present invention, the term "high porosity" refers to porosities greater than about 45%. In other embodiments of the present invention, the term "high porosity" refers to porosities greater than about 50%. In other embodiments of the present invention, the term "high porosity" refers to porosities greater than about 55%. In other embodiments of the present invention, the term "high porosity" refers to porosities greater than about 60%. In other embodiments of the present invention, the term "high porosity" refers to porosities greater than about 70%. The second proppant particulate is placed in the near-well bore portion of a fracture substantially near the placement area of the first proppant particulates. The term "near-well bore" refers to the portion of a fracture that is substantially adjacent or proximate to the well bore and distal to the fracture tip.

The present invention allows a fracture to be propped so that the majority of the proppant particulates are of a low-quality, less expensive first proppant particulate. The remainder of the proppant particulate needed to prop the fracture may be a higher-quality, more crush resistant proppant particulate, which is placed in the fracture as a partial monolayer. By placing the first proppant particulate in the far-well bore portion of a fracture and the second proppant particulate in the near-well bore portion of the fracture, the fracture may be propped and the conductivity of the fracture maintained at a much lower cost as compared to traditional methods. Accordingly, the present invention provides methods of forming a propped fracture comprising: providing a fracture having a far-well bore area and a near-well bore area in a portion of a subterranean formation; providing a first proppant particulate, wherein the first proppant particulate is at least partially coated with an adhesive substance; placing the first proppant particulate in the far-well bore area of the fracture; providing a second proppant particulate; wherein the second proppant particulate is capable of forming a partial monolayer; and placing the second proppant particulate in the near-well bore area of the fracture so as to form a high porosity propped region in the near-well bore area.

The first proppant particulate used in the methods of the present invention may be any proppant particulate that is at least partially coated with an adhesive substance. As discussed above, proppant particulates can be used to prop fractures; and when coated with an adhesive substance, proppant particulates may consolidate in the fracture thereby reducing the flow-back of proppant and other particulates during production. In certain embodiments, the first proppant particulates represent about 40% to about 90% of the total proppant particulate used in the fracture.

Any proppant particulates known in the art may be suitable for use as the first proppant particulate of the present invention. Examples of suitable first proppant particulates include, but are not limited to, sand; bauxite; ceramic materials; glass materials; polymer materials; Teflon® materials; nut shell pieces; seed shell pieces; cured resinous particulates comprising nut shell pieces; cured resinous particulates comprising seed shell pieces; fruit pit pieces; cured resinous particulates comprising fruit pit pieces; processed wood; composite particulates prepared from a binder and filler particulate including silica, alumina, fumed carbon, carbon black, graphite, mica, titanium dioxide, metasilicate, calcium silicate, kaolin, talc, zirconia, boron, fly ash, hollow glass microspheres, and solid glass; and combinations thereof.

In general, suitable first proppant particulates are of a size such that formation fines that may migrate with produced fluids are prevented from being produced from the formation. The first proppant particulate used in the methods of the present invention may be of any size and shape combination known in the art as suitable for use in a fracturing operation. Generally, where the chosen proppant particulate is substantially spherical, suitable proppant particulates have a size in the range of from about 2 to about 400 mesh, U.S. Sieve Series. In some embodiments of the present invention, the proppant particulates have a size in the range of from about 8 to about 100 mesh, U.S. Sieve Series. One of ordinary skill in the art with the benefit of this disclosure, will recognize the preferred size of the first proppant particulate based on, for example, the distribution of the formation particulates to be screened out by the first proppant particulates.

Although the first proppant particulate is generally substantially spherical, suitable examples also include all known shapes of materials including such as fibrous materials, polygonal materials (such as cubic materials), and mixtures thereof. In some embodiments of the present invention it may be desirable to use substantially non-spherical first proppant particulates. Suitable substantially non-spherical first proppant particulates may be cubic, polygonal, fibrous, or any other non-spherical shape. Such substantially non-spherical first proppant particulates may be, for example, cubic-shaped, rectangular shaped, rod shaped, ellipse shaped, cone shaped, pyramid shaped, or cylinder shaped.

In some preferred embodiments of the present invention, a low-quality proppant particulate may be used as the first proppant particulate.

As used herein, the term "low-quality proppant particulates" refers to proppant particulates that do not meet at least one of the standards for sphericity, roundness, size, turbidity, acid solubility, percentage of fines, or crush resistance as recited in American Petroleum Institute Recommended Practices (API RP) standard number 56 for particulates used in fracturing operations.

API RP 56 describes the minimum standard for sphericity as at least 0.6 and for roundness as at least 0.6. As used herein, the terms "sphericity" and "roundness" are defined as described in API RP 56 and can be determined using the procedures set forth in API RP 56. API RP 56 also sets forth some commonly recognized proppant sizes as 6/12, 8/16, 12/20, 20/40, 30/50, 40/70, and 70/140. API RP 56 further notes that a minimum percentage of particulates that should fall between designated sand sizes and that not more than 0.1 weight % of the particulates should be larger than the larger sand size and not more than 1 weight % should be smaller than the small sand size. Thus, for 20/40 proppant, no more than 0.1 weight % should be larger than 20 U.S. Mesh and no more than 1 weight % smaller than 40 U.S. Mesh.

API RP 56 describes the minimum standard for proppant particulate turbidity as 250 FTU or less. API RP 56 describes the minimum standard for acid solubility as no more than 2 weight % loss when tested according to API RP 56 procedures for proppant sized between 6/12 mesh and 30/50 mesh, U.S. Sieve Series and as no more than 3 weight % loss when tested according to API RP 56 procedures for proppant sized between 40/70 mesh and 70/140 mesh, U.S. Sieve Series. According to API RP 56, the acid solubility of a proppant particulate (e.g., sand) in hydrochloric-hydrofluoric acid solution (i.e., 12% by weight HCL and 3% by weigh HF) is an indication of the amount of undesirable contaminants (e.g., carbonates, feldspars, iron oxides, clays, and the like) present in the proppant particulates. API RP 56 describes the minimum standard for crush resistance of proppant as producing not more than the suggested maximum fines as set forth in Table 1, below, for the size being tested:

TABLE 1

Suggested Maximum Fines for Proppant Particulate Subjected to Crushing Strength

| Mesh Size (U.S. Sieve Series) | Crushing Force (lbs) | Stress on Proppant Particulate (psi) | Maximum Fines (% by weight) |
| --- | --- | --- | --- |
| 6/12 | 6,283 | 2,000 | 20 |
| 8/16 | 6,283 | 2,000 | 18 |
| 12/20 | 9,425 | 3,000 | 16 |
| 16/30 | 9,425 | 3,000 | 14 |
| 20/40 | 12,566 | 4,000 | 14 |
| 30/50 | 12,566 | 4,000 | 10 |
| 40/70 | 15,708 | 5,000 | 8 |
| 70/140 | 15,708 | 5,000 | 6 |

The first proppant particulates of the present invention are at least partially coated with an adhesive substance. Adhesive substances suitable for use in the present invention include tackifying agents (nonaqueous tackifying agents and aqueous tackifying agents); silyl-modified polyamides; and curable resin compositions that are capable of curing to form hardened substances. In addition to encouraging the first proppant particulates to form aggregates, the use of an adhesive substance may yield a propped fracture that experiences very little or no undesirable flow back of proppant or formation particulate. Furthermore, the application of an adhesive substance to the first proppant particulates may aid in the formation of aggregates that increase the ability of the proppant particulates to effectively hold open a fracture for production. Adhesive substances may be applied on-the-fly at the well site or may be applied in advance and.

Nonaqueous tackifying agents suitable for coating the first proppant particulates of the present invention comprise any compound that, when in liquid form or in a solvent solution, will form a nonhardening coating upon a particulate. One example of a suitable group of nonaqueous tackifying agents comprise polyamides that are liquids or in solution at the temperature of the subterranean formation such that they are, by themselves, nonhardening when introduced into the subterranean formation. Another example of a suitable nonaqueous tackifying agent is condensation reaction product comprised of commercially available polyacids and polyamines. Such commercial products include compounds such as mixtures of $C_{36}$ dibasic acids containing some trimer and higher oligomers and also small amounts of monomer acids that are reacted with polyamines. Other polyacids include trimer acids, synthetic acids produced from fatty acids, maleic anhydride, acrylic acid, and the like. Such acid compounds are commercially available from companies such as Witco Corporation, Union Camp, Chemtall, and Emery Industries. The reaction products are available from, for example, Champion Technologies, Inc. and Witco Corporation. Additional compounds which may be used as nonaqueous tackifying agents include liquids and solutions of, for example, polyesters, polycarbonates and polycarbamates, natural resins such as shellac, and the like. Other suitable tackifying agents are described in U.S. Pat. No. 5,853,048 issued to Weaver, et al. and U.S. Pat. No. 5,833,000 issued to Weaver, et al., the relevant disclosures of which are incorporated herein by reference.

Nonaqueous tackifying agents suitable for use in the present invention may be either used such that they form nonhardening coating or they may be combined with a multifunctional material capable of reacting with the nonaqueous tackifying agent to form a hardened coating. A "hardened coating," as used herein, means that the reaction of the nonaqueous tackifying agent with the multifunctional material will result in a substantially nonflowable reaction product that exhibits a higher compressive strength in a consolidated agglomerate than the nonaqueous tackifying agent alone. In this instance, the tackifying agent may function similarly to a hardenable resin. Multifunctional materials suitable for use in the present invention include, but are not limited to, aldehydes such as formaldehyde, dialdehydes such as glutaraldehyde, hemiacetalsi or aldehyde releasing compounds, diacid halides, dihalides such as dichlorides and dibromides, polyacid anhydrides such as citric acid, epoxides, furfuraldehyde, glutaraldehyde or aldehyde condensates and the like, and combinations thereof. In some embodiments of the present invention, the multifunctional material may be mixed with the nonaqueous tackifying agent in an amount of from about 0.01% to about 50% by weight of the nonaqueous tackifying agent to effect formation of the reaction product. In other embodiments, the multifunctional material is used in an amount of from about 0.5% to about 1% by weight of the nonaqueous tackifying compound. Suitable multifunctional materials are described in U.S. Pat. No. 5,839,510 issued to Weaver, et al., the relevant disclosure of which is incorporated herein by reference. Other suitable tackifying agents are described in U.S. Pat. No. 5,853,048 issued to Weaver, et al., the relevant disclosure of which is incorporated herein by reference.

Solvents suitable for use with the nonaqueous tackifying agents of the present invention include any solvent that is compatible with the nonaqueous tackifying agent and achieves the desired viscosity effect. The solvents that can be used in the present invention include those having high flash points (most preferably above about 125° F.). Examples of solvents suitable for use in the present invention include, but are not limited to, butylglycidyl ether, dipropylene glycol methyl ether, butyl bottom alcohol, dipropylene glycol dimethyl ether, diethyleneglycol methyl ether, ethyleneglycol butyl ether, methanol, butyl alcohol, isopropyl alcohol, diethyleneglycol butyl ether, propylene carbonate, d'limonene, 2-butoxy ethanol, butyl acetate, furfuryl acetate, butyl lactate, dimethyl sulfoxide, dimethyl formamide, fatty acid methyl esters, and combinations thereof. It is within the ability of one skilled in the art, with the benefit of this disclosure, to determine whether a solvent is needed to achieve a viscosity suitable to the subterranean conditions and, if so, how much.

As mentioned above, suitable adhesive substances include aqueous tackifying agents. Suitable aqueous tackifying agents are capable of forming at least a partial coating upon the surface of a particulate (such as a first proppant particulate). Generally, suitable aqueous tackifying agents are not significantly tacky until they are "activated" (that is destabilized, coalesced and/or reacted) to transform the aqueous tackifying agent into a sticky, tackifying compound at a desirable time. Such activation may occur before, during, or after an aqueous tackifying agent is placed in the subterranean formation. In some embodiments, a pretreatment may be first contacted with the surface of a particulate to prepare it to be coated with an aqueous tackifying agent. Suitable aqueous tackifying agents are generally charged polymers that comprise compounds that, when in an aqueous solvent or solution, will form a nonhardening coating (by itself or with an activator) and, when placed on a particulate, will increase the continuous critical resuspension velocity of the particulate when contacted by a stream of water. The term "continuous critical resuspension velocity" refers to the velocity of flowing water that is at least about 3 to about 5 times that of the uncoated particulate when the particulate is resuspended, lifted, or detached from a packed position. Continuous critical resuspension velocities are further described in Example 7 of U.S. patent application Ser. No. 10/864,061 filed Jun. 9, 2004, the disclosure of which is incorporated herein by reference. The aqueous tackifying agent may enhance the grain-to-grain contact between the individual particulates within the formation (be they proppant particulates, formation particulates, or other particulates), helping bring about the consolidation of the particulates into a cohesive and permeable mass.

Examples of aqueous tackifying agents suitable for use in the present invention include, but are not limited to, acrylic acid polymers, acrylic acid ester polymers, acrylic acid derivative polymers, acrylic acid homopolymers, acrylic acid ester homopolymers (such as poly(methyl acrylate), poly(butyl acrylate), and poly(2-ethylhexyl acrylate)), acrylic acid ester copolymers, methacrylic acid derivative polymers, methacrylic acid homopolymers, methacrylic acid ester homopolymers (such as poly(methyl methacrylate), poly(butyl methacrylate), and poly(2-ethylhexyl methacrylate)), acrylamido-methyl-propane sulfonate polymers, acrylamido-methyl-propane sulfonate derivative polymers, acrylamido-methyl-propane sulfonate copolymers, acrylic acid/acrylamido-methyl-propane sulfonate copolymers, and combinations thereof. Methods of determining suitable aqueous tackifying agents and additional disclosure on aqueous tackifying agents can be found in U.S. patent application Ser. No. 10/864,061 filed on Jun. 9, 2004 and U.S. patent application Ser. No. 10/864,618 filed on Jun. 9, 2004, the relevant disclosures of which are incorporated herein by reference.

Silyl-modified polyamides suitable for use as an adhesive substance in the methods of the present invention may be described as substantially self-hardening compositions that are capable of at least partially adhering to particulates in the unhardened state, and that are further capable of self-hardening themselves to a substantially nontacky state to which individual particulates such as formation fines will not adhere to, for example, in formation or proppant pack pore throats. Such silyl-modified polyamides may be based, for example, on the reaction product of a silating compound with a polyamide or a mixture of polyamides. The polyamide or mixture of polyamides may be one or more polyamide intermediate compounds obtained, for example, from the reaction of a polyacid (e.g., a diacid or higher) with a polyamine (e.g., a diamine or higher) to form a polyamide polymer with the elimination of water. Other suitable silyl-modified polyamides and methods of making such compounds are described in U.S. Pat. No. 6,439,309 issued to Matherly, et al., the relevant disclosure of which is incorporated herein by reference.

Curable resin compositions suitable for use as an adhesive substance generally comprise a curable resin and a curing agent. Suitable curable resins include all resins known in the art that are capable of forming a hardened, consolidated mass. Many such resins are commonly used in subterranean consolidation operations, and some suitable resins include two-component epoxy-based resins, glycidyl ether resins, butoxymethyl butyl glycidyl ether resins, novolak resins, polyepoxide resins, urea-aldehyde resins, urethane resins, polyurethane resins and hybrids and copolymers thereof, phenolic resins, phenol-aldehyde resins, bisphenol A diglycidyl ether resins, bisphenol A-epichlorohydrin resins, phenol formaldehyde resins, phenolic/latex resins, furan resins, furan/furfuryl alcohol resins, polyester resins and hybrids and copolymers thereof, acrylate resins, and combinations thereof. It is within the ability of one skilled in the art, with the benefit of this disclosure, to select a suitable curable resin for use in curable resin composition and to determine whether and which curing agent is required to trigger curing.

Suitable curing agents are those capable of acting on a curable resin so that it forms a hardened, consolidated mass. The type of curing agent depends on the curable resin chosen. For example, some suitable curable resins, such as epoxy resins, may be hardened with a curing agent that is an internal catalyst or activator. These curable resin compositions, when pumped down hole, may be cured using only time and temperature. Other suitable curing agents are used when the curable resins, e.g., a furan resin, requires a time-delayed catalyst or an external catalyst to help activate the polymerization of the curable resins if the cure temperature is low (i.e., less than about 250° F.), but will cure under the effect of time and temperature if the formation temperature is above about 250° F., e.g., 300° F. Examples of suitable curing agents include, but are not limited to, piperazine, derivatives of piperazine (e.g., aminoethylpiperazine), 2H-pyrrole, pyrrole, imidazole, pyrazole, pyridine, pyrazine, pyrimidine, pyridazine, indolizine, isoindole, 3H-indole, indole, 1H-indazole, purine, 4H-quinolizine, quinoline, isoquinoline, phthalazine, naphthyridine, quinoxaline, quinazoline, 4H-carbazole, carbazole, β-carboline, phenanthridine, acridine, phenathroline, phenazine, imidazolidine, phenoxazine, cinnoline, pyrrolidine, pyrroline, imidazoline, piperidine, indoline, isoindoline, quinuclindine, morpholine, azocine, azepine, 2H-azepine, 1,3,5-triazine, thiazole, pteridine, dihydroquinoline, hexa methylene imine, indazole, amines, aromatic amines, polyamines, aliphatic amines, cyclo-aliphatic amines, amides, polyamides, 2-ethyl-4-methyl imidazole, 1,1,3-trichlorotrifluoroacetone, and combinations thereof. The curing agent may be included in the curable resin compositions in an amount in the range of from about 5% to about 60% by weight of the curable resin. In some embodiments, the curing agent is included in the curable resin compositions in an amount in the range of from about 40% to about 60% by weight of the curable resin. The chosen curing agent often effects the range of temperatures over which a curable resin is able to cure. For example, curing agents that comprise piperazine or a derivative of piperazine have been shown capable of curing various curable resins from temperatures as low as about 70° F. to as high as about 350° F. By way of example, for temperatures closer to 70° F. a mixture of bisphenol A diglycidyl ether resin and bisphenol A-epichlorohydrin resin may be suitable; and for temperatures closer to 350° F., a mixture of aliphatic glycidyl ether, bisphenol A/novolac epoxy resin, and bisphenol A-epichlorohydrin resin may be suitable.

Any solvent that is compatible with the curable resin compositions and achieves the desired viscosity effect is suitable for use in the present invention. Preferred solvents include those listed above in connection with tackifying agents. It is within the ability of one skilled in the art, with the benefit of this disclosure, to determine whether and how much solvent is needed to achieve a suitable viscosity. Solvents suitable for use in the present invention include, but are not limited to, butyl lactate, butylglycidyl ether, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, methanol, butyl alcohol, d'limonene, fatty acid methyl esters, and combinations thereof.

Suitable curable resin compositions also may comprise a silane coupling agent, among other things, to act as a mediator to help bond the curable resin to the first proppant particulates; a surfactant for, among other things, facilitating the coating of first proppant particulate prior to placement in a subterranean formation; and an optional liquid carrier fluid for, among other things, reducing the viscosity of the curing agent component. It is within the ability of one skilled in the art, with the benefit of this disclosure, to determine whether a liquid carrier fluid is needed and, if so, how much liquid carrier fluid is needed to achieve a suitable viscosity.

The second proppant particulates suitable for use in the methods of the present invention are capable of forming a partial monolayer of proppant particulates. In general, any proppant particulate, or combination of proppant particulates, suitable for use as a first proppant particulate is suitable for use as a second proppant particulate. The second proppant particulate, however, generally has a larger mesh size than the first proppant particulate. For example, in certain embodiments, the second proppant particulate can be about two times the size of the first proppant particulate. In certain embodiments, the second proppant particulate represents about 10% to about 60% of the total proppant particulate used in the fracture.

Like the first proppant particulate, the second proppant particulate may be substantially spherical or substantially non-spherical. When substantially non-spherical, however, the second proppant particulate generally has an aspect ratio such that the material is fibrous to such that it is cubic, octagonal, or any other configuration. Substantially non-spherical second proppant particulates are generally sized such that the longest axis is from about 0.02 inches to about 0.3 inches in length. In other embodiments, the longest axis is from about 0.05 inches to about 0.2 inches in length. In one embodiment, the substantially non-spherical second proppant particulates are cylindrical having an aspect ratio of about 1.5 to 1 and about 0.08 inches in diameter and about 0.12 inches in length. In another embodiment, the substantially non-spherical second proppant particulates are cubic having sides about 0.08 inches in length.

In certain embodiments of the present invention, a high-quality proppant particulate is particularly well-suited for use as the second proppant particulate. The term "high-quality" refers to proppant particulates that meet or exceed the standards for size, turbidity, acid solubility, and percentage of fines as recited in American Petroleum Institute Recommended Practices (API RP) standard number 56 for particulates used in fracturing operations. Examples of suitable second proppant particulates include, but are not limited to, graded sand, bauxite, ceramic materials, glass materials, polymeric materials, resinous materials, rubber materials, and the like.

In some embodiments, the second proppant particulates may be coated with an adhesive substance (such as a resin or tackifier). Such a coating of an adhesive substance may give the proppant particulates a tendency to adhere to each other when they come in contact. The chosen adhesive substance should be strong enough that the second proppant particulates create discrete clusters while under static condition or under low shear rates. As the shear rate increases, the proppant clusters or aggregates may become dispersed into smaller clusters or even individual proppant particulates. This phenomenon may repeat again and again from the time the coated proppant is introduced into the fracturing fluid, pumped into the well bore and fracture, and even after being placed inside the fracture. Such methods of forming high porosity propped fractures are described in more detail in U.S. patent application Ser. No. 10/937,076 filed on filed on Sep. 9, 2004 and titled "High Porosity Fractures and Methods of Creating High Porosity Fractures."

In some embodiments of the present invention, the proppant particulates suitable for use in the present invention comprise at least one high density plastic. As used herein, the term "high density plastic" refers to a plastic having a specific gravity of greater than about 1. In certain embodiments, the density range is from about 1 to about 2. In other embodiments, the density range is from about 1 to about 1.3. In other embodiments, the density range is from about 1.1 to about 1.2. In addition to being a high density plastic, plastics suitable for use in the present invention generally exhibit a crystallinity of greater than about 10%. In some embodiments, the high density plastic used to form the second proppant particulates of the present invention exhibits a crystallinity of greater than about 20%. While the material is referred to as "high density," it will be readily understood by one skilled in the art that the density is "high" relative to other plastics, but may be low as compared to traditional proppant particulate densities. For example, Ottawa sand may exhibit a specific gravity of about 2.65 whereas man-made ceramic proppants generally have specific gravities ranging from about 2.7 to about 3.6. The relatively low density of the high density plastics used to create the second proppant particulates of the present invention may be beneficial to an even distribution when the second proppant particulates are slurried into a fluid such as a fracturing fluid. Such even distribution may be particularly helpful in forming a partial monolayer of proppant particulate that is capable of holding open a fracture. Uneven distribution may arise when a portion of a fracture is propped while another portion is substantially void of second proppant particulates; and could result in a fracture that does not remain open once the hydraulic pressure is released, thereby allowing the fracture to close on the proppant particulates.

Some well-suited high density plastic materials include polyamide 6 (Nylon 6), polyamide 66 (Nylon 6/6), acrylic, acrylonitrile butadiene styrene (ABS), ethylene vinyl alcohol, polycarbonate/PET polyester blend, polyethylene terephthalate (PET), unreinforced polycarbonate/polybutylene terephthalate (PC/PBT) blend, PETG copolyester, polyetherimide, polyphenylene ether, molded polyphenylene sulfide (PPS), heat resistant grade polystyrene, polyvinylbenzene, acrylonitrile-butadiene-styrene, polyvinylchloride, fluoroplastics, polysulfide, polypropylene, styrene acrylonitrile, polystyrene, phenylene oxide, polyolefins, polystyrene divinylbenzene, polyfluorocarbons, polyethers etherketones, polyamide imides, and combinations thereof. Some other well-suited high density plastic materials include oil-resistant thermoset resins such as acrylic-based resins, epoxy-based resins, furan-based resins, phenolic-based resins, phenol/phenol formaldehyde/furfuryl alcohol resins, polyester resins, and combinations thereof.

In some embodiments of the present invention, it may be desirable to reinforce second proppant particulates made of high density plastic to increase their resistance to a crushing or deforming force. Suitable reinforcing materials include high strength particles such as bauxite, ceramic, metal, glass, sand, asbestos, mica, silica, alumina, and any other available material that is smaller in size than the desired, final high density plastic proppant particulate and that is capable of adding structural strength to the desired, final high density plastic proppant particulate. In some embodiments of the present invention the reinforcing material may be a fibrous material such as glass fibers or cotton fibers. Generally, the reinforcing material is chosen so as to not unduly increase the specific gravity of the final proppant particulate.

One benefit of using second proppant particulates formed from high density plastic is that they may be created on-the-fly during a fracturing operation. Methods of creating second proppant particulates from thermoplastic materials on-the-fly is described in U.S. patent application Ser. No. 10/853,879 filed May 26, 2004 and titled "On-The-Fly Preparation of Proppant and its Use in Subterranean Operations," the relevant disclosure of which is incorporated herein by reference. As described in that application, one example of a method for preparing proppant on-the-fly generally comprises providing a mixture comprising a thermoplastic/thermosetting polymer and a filler; heating the resin mixture; extruding, atomizing, or spraying the mixture to particulate form into a well bore containing a treatment fluid; and allowing the extruded particulate to substantially cure and form proppant particulates. This method relies, at least in part, on the ability of thermoplastic/thermosetting materials to be extruded from a liquid form at an elevated temperature, and then as the material cools, to then harden and form into a solid material. The thermoplastic or thermosetting second proppant particulates can be prepared on-the-fly, according to the present invention, to a suitable size and shape.

Density and strength of second proppant particulates formed from thermoplastic/thermosetting materials may be customized to meet the fracturing designs and well conditions. In some embodiments, to help eliminate the problems that may be caused by large particle size, the on-the-fly thermoplastic second proppant particulates may be introduced into the fracturing fluid at the discharge side of the pump. As will be recognized by one skilled in the art, during pumping of such on-the-fly thermoplastic second proppant particulates (particularly where the flow passes through one or more perforations), the second proppant particulates may break into smaller sizes as a result of high shear as they are being placed inside a portion of a subterranean formation.

Generally, the high density plastics suitable for use in forming the second proppant particulates of the present invention are oil-resistant. That is, they do not degrade in the presence of hydrocarbon fluids and other fluids present in the subterranean formation; this allows the second proppant particulates to maintain their integrity in the presence of produced hydrocarbon products, formation water, and other compositions normally produced from subterranean formations. In some embodiments of the present invention, however, a portion of the second proppant particulates may be formed from degradable particles. One purpose for including degradable particles in a propped fracture is to ensure the permeability of the propped fracture.

In some embodiments, the degradable particles used are oil-degradable materials. When such oil-degradable second proppant particulates are used, in the event the closure of the fracture undesirably compacts the proppant (thus undesirably reducing the permeability of the proppant pack) the oil-degradable proppant may be degraded by the produced fluids, thus restoring at least some of the lost permeability. The degradable proppant may also be degraded by materials purposely placed in the formation by injection, mixing the degradable particle with delayed reaction degradation agents, or other suitable means to induce degradation.

In some embodiments of the present invention, a partial monolayer may be formed using second proppant particulates and degradable particles. Thus, as the degradable particles are removed with time, the porosity of the second proppant particulate proppant pack increases. The degradable particles are preferably substantially uniformly distributed throughout the formed second proppant particulate proppant pack. Over time, the degradable material will degrade in situ, causing the degradable material to substantially be removed from the proppant pack and to leave behind voids in the proppant pack. These voids enhance the porosity of the proppant pack, which may result, among other things, in enhanced conductivity of the fracture.

Suitable degradable materials include oil-degradable polymers. Oil-degradable polymers that may be used in accordance with the present invention may be either natural or synthetic polymers. Some particular examples include, but are not limited to, polyacrylics; polyamides; and polyolefins such as polyethylene, polypropylene, polyisobutylene, and polystyrene. Other suitable oil-degradable polymers include those that have a melting point so that the polymer will dissolve at the temperature of the subterranean formation in which it is placed such as a wax material.

In addition to oil-degradable polymers, other degradable materials that may be used in conjunction with the present invention include, but are not limited to, degradable polymers, dehydrated salts, and/or mixtures of the two.

As for degradable polymers, a polymer is considered to be "degradable" herein if the degradation is due to, among other things, chemical and/or radical process such as hydrolysis, oxidation, or UV radiation. The degradability of a polymer depends, at least in part, on its backbone structure. For instance, the presence of hydrolyzable and/or oxidizable linkages in the backbone often yields a material that will degrade as described herein. The rates at which such polymers degrade are dependent on the type of repetitive unit, composition, sequence, length, molecular geometry, molecular weight, morphology (e.g., crystallinity, size of spherulites, and orientation), hydrophilicity, hydrophobicity, surface area, and additives. Also, the environment to which the polymer is subjected may affect how it degrades, e.g., temperature, presence of moisture, oxygen, microorganisms, enzymes, pH, and the like.

It is desirable that the degradable particle has similar particle size, shape, and specific gravity as those of the second proppant particulate in order to enhance the distribution of degradable particles among the second proppant particulate and to minimize the segregation between the materials. In case the two particulate materials are different in shape, particle size, specific gravity, or some combination thereof, a tackifying agent may be coated onto the particulate materials to, inter alia, enhance their uniform distribution as they are blended, pumped down hole, and placed inside the created fracture.

Suitable examples of degradable polymers that may be used in accordance with the present invention include but are not limited to those described in the publication of Advances in Polymer Science, Vol. 157 entitled "Degradable Aliphatic Polyesters" edited by A. C. Albertsson. Specific examples include homopolymers, random, block, graft, star-, and hyper-branched aliphatic polyesters. Polycondensation reactions, ring-opening polymerizations, free radical polymerizations, anionic polymerizations, carbocationic polymerizations, coordinative ring-opening polymerization, and any other suitable process may prepare such suitable degradable polymers. Specific examples of suitable degradable polymers include polysaccharides such as dextran or cellulose; chitins; chitosans; proteins; aliphatic polyesters; poly(lactides); poly(glycolides); poly($\epsilon$-caprolactones); poly (hydroxybutyrates); poly(anhydrides); aliphatic or aromatic polycarbonates; poly(orthoesters); poly(amino acids); poly(ethylene oxides); and polyphosphazenes.

Aliphatic polyesters degrade chemically, among other things, by hydrolytic cleavage. Hydrolysis can be catalyzed by either acids or bases. Generally, during the hydrolysis, carboxylic end groups are formed during chain scission, and this may enhance the rate of further hydrolysis. This mechanism is known in the art as "autocatalysis," and is thought to make polyester matrices more bulk eroding. One example of a particularly suitable aliphatic polyesters is poly(lactide). Poly(lactide) is synthesized either from lactic acid by a condensation reaction or more commonly by a ring-opening polymerization of cyclic lactide monomer.

Polyanhydrides are another type of particularly suitable degradable polymer useful in the present invention. Polyanhydride hydrolysis proceeds, among other things, via free carboxylic acid chain-ends to yield carboxylic acids as final degradation products. The erosion time can be varied over a broad range of changes in the polymer backbone. Examples of suitable polyanhydrides include poly(adipic anhydride), poly(suberic anhydride), poly(sebacic anhydride), and poly(dodecanedioic anhydride). Other suitable examples include, but are not limited to, poly(maleic anhydride) and poly(benzoic anhydride).

Dehydrated salts may be used in accordance with the present invention as a degradable material. A dehydrated salt is suitable for use in the present invention if it will degrade over time as it hydrates. For example, a particulate solid anhydrous borate material that degrades over time may be suitable. Specific examples of particulate solid anhydrous borate materials that may be used include, but are not limited to, anhydrous sodium tetraborate (also known as anhydrous borax) and anydrous boric acid. These anhydrous borate materials are only slightly soluble in water. However, with time and heat in a subterranean environment, the anhydrous borate materials react with the surrounding aqueous fluid and are hydrated. The resulting hydrated borate materials are highly soluble in water as compared to anhydrous borate materials and as a result degrade in the aqueous fluid. In some instances, the total time required for the anhydrous borate materials to degrade in an aqueous fluid is in the range of from about 8 hours to about 72 hours depending upon the temperature of the subterranean zone in which they are placed. Other examples include organic or inorganic salts like acetate trihydrate.

Blends of certain degradable materials may also be suitable. One example of a suitable blend is a mixture of poly(lactic acid) and sodium borate, in which the mixing of an acid and base could result in a neutral solution when this is desirable. Another example would include a blend of poly(lactic acid) and boric oxide. Other materials that undergo an irreversible degradation may also be suitable, if the products of the degradation do not undesirably interfere with either the conductivity of the proppant matrix or with the production of any of the fluids from the subterranean formation.

In choosing the appropriate degradable material, one should consider the degradation products that will result. These degradation products should not adversely affect other operations or components and may even be selected to improve the long term performance/conductivity of the propped fracture. The choice of degradable material also can depend, at least in part, on the conditions of the well, e.g., well bore temperature. For instance, lactides have been found to be suitable for lower temperature wells, including those within the range of 60° F. to 150° F., and polylactides have been found to be suitable for well bore temperatures above this range. Also, poly(lactic acid) may be suitable for higher temperature wells. Some stereoisomers of poly(lactide) or mixtures of such stereoisomers may be suitable for even higher temperature applications. Dehydrated salts may also be suitable for higher temperature wells.

In some embodiments a particularly useful result may be achieved if the degradable material degrades slowly over time as opposed to instantaneously. Likewise, particularly useful results have been obtained when the degradable material does not begin to degrade until after the proppant matrix has become a stable proppant pack, which often occurs after a stress load is applied to the proppant pack as the fracture tries to close. The slow degradation of the degradable material, among other things, helps to maintain the stability of the proppant matrix.

The specific features of the degradable material may be chosen or modified to provide the propped fracture with optimum conductivity while maintaining its desirable filtering capability. Generally, the degradable material is selected to have a size and shape similar to the size and shape of the curable second proppant particulates to help maintain substantial uniformity within the mixture. It may be preferable if the second proppant particulates and the degradable material do not segregate when mixed. Whichever degradable material is utilized, the degradable materials may have any shape, depending on the desired characteristics of the resultant voids in the proppant matrix including, but not limited to, particles having the physical shape of platelets, shavings, flakes, ribbons, rods, strips, spheroids, toroids, pellets, tablets, or any other physical shape. The physical shape of the degradable material should be chosen so as to enhance the desired shape and relative composition of the resultant voids within the proppant matrix. For example, a rod-like particle shape may be suitable in applications wherein channel-like voids in the proppant matrix are desired. One of ordinary skill in the art, with the benefit of this disclosure, will recognize the specific degradable material and the preferred size and shape for a given application.

In some embodiments of the present invention, from about 10% to about 90% of the second proppant particulates used to form the partial monolayer are degradable. In other embodiments, from about 20% to about 70% of the second proppant particulates used to form the partial monolayer are degradable. In still other embodiments, from about 25% to about 50% of the second proppant particulates used to form the partial monolayer are degradable. The relative amounts of the degradable material should not be such that when degraded, an undesirable percentage of voids result in the partial monolayer making the partial monolayer potentially ineffective in maintaining the integrity of the fracture. One of ordinary skill in the art with the benefit of this disclosure will recognize an optimum concentration of degradable material that provides desirable values in terms of enhanced conductivity or permeability without undermining the stability of the partial monolayer itself.

The fractures of the methods of the present invention may be provided by any method known in the art, with the benefit of this disclosure. For example, fractures may be present in a subterranean formation naturally, or fractures may be introduced into a subterranean formation by hydraulic fracturing. Hydraulic fracturing, as discussed above, is a production stimulation operation in which a formation is treated to increase its permeability by hydraulically fracturing the formation to create or enhance one or more cracks or "fractures." In most cases, hydraulic fracturing involves pumping a viscous fluid (known as a pad fluid) into a formation faster than the fluid can escape into the formation so that the pressure in the formation rises and the formation breaks, creating an artificial fracture or enlarging a natural fracture.

Any fracturing fluid suitable for a fracturing application may be used in accordance with the teachings of the present invention, including aqueous gels, emulsions, and other suitable fracturing fluids including oil-based fluids. Suitable aqueous gels are generally comprised of water and one or more gelling agents. Suitable emulsions can be comprised of two immiscible liquids such as an aqueous gelled liquid and a liquefied, normally gaseous, fluid, such as carbon dioxide or nitrogen. In certain embodiments of the present invention, the fracturing fluids are aqueous gels comprised of water, a gelling agent for gelling the water and increasing its viscosity, and, optionally, a crosslinker for crosslinking the gel and further increasing the viscosity of the fluid. The increased viscosity of the gelled, or gelled and crosslinked, fracturing fluid, among other things, reduces fluid loss and allows the fracturing fluid to transport significant quantities of suspended proppant particulates. The water used to form the fracturing fluid may be salt water, brine, or any other aqueous liquid that does not adversely react with the other components.

A variety of gelling agents may be used, including hydratable polymers that contain one or more functional groups such as hydroxyl, carboxyl, sulfate, sulfonate, amino, or amide groups. Suitable gelling typically comprise biopolymers, synthetic polymers, or a combination thereof. A variety of gelling agents can be used in conjunction with the methods of the present invention, including, but not limited to, hydratable polymers that contain one or more functional groups such as hydroxyl, cis-hydroxyl, carboxylic acids, derivatives of carboxylic acids, sulfate, sulfonate, phosphate, phosphonate, amino, or amide. In certain embodiments, the gelling agents may be biopolymers comprising polysaccharides, and derivatives thereof that contain one or more of these monosaccharide units: galactose, mannose, glucoside, glucose, xylose, arabinose, fructose, glucuronic acid, or pyranosyl sulfate. Examples of suitable biopolymers include, but are not limited to, guar gum and derivatives thereof, such as hydroxypropyl guar and carboxymethylhydroxypropyl guar, and cellulose derivatives, such as hydroxyethyl cellulose. Additionally, synthetic polymers and copolymers that contain the above-mentioned functional groups may be used. Examples of such synthetic polymers include, but are not limited to, polyacrylate, polymethacrylate, polyacrylamide, polyvinyl alcohol, and polyvinylpyrrolidone. In other embodiments, the gelling agent molecule may be depolymerized. The term "depolymerized," as used herein, generally refers to a decrease in the molecular weight of the gelling agent molecule. Depolymerized gelling agent molecules are described in U.S. Pat. No. 6,488,091 issued Dec. 3, 2002 to Weaver, et al., the relevant disclosure of which is incorporated herein by reference. Suitable gelling agents generally are present in the fracturing fluids used in the methods of the present invention in an amount in the range of from about 0.1% to about 5% by weight of the water therein. In certain embodiments, the gelling agents are present in the fracturing fluids in an amount in the range of from about 0.01% to about 2% by weight of the water therein.

Crosslinkers may be used to crosslink gelling agent molecules to form crosslinked gelling agents. Crosslinkers typically comprise at least one metal or metalloid that is capable of crosslinking at least two gelling agent molecules. Examples of suitable crosslinkers include, but are not limited to, zirconium compounds (such as, for example, zirconium lactate, zirconium lactate triethanolamine, zirconium carbonate, zirconium acetylacetonate, zirconium malate, zirconium citrate, and zirconium diisopropylamine lactate); titanium compounds (such as, for example, titanium lactate, titanium malate, titanium citrate, titanium ammonium lactate, titanium triethanolamine, and titanium acetylacetonate); aluminum compounds (such as, for example, aluminum lactate or aluminum citrate); boron compounds (such as, for example, ulexite, colemanite, calcined and colemanite); antimony compounds; chromium compounds; iron compounds; copper compounds; zinc compounds; or a combination thereof. An example of a suitable commercially available zirconium-based crosslinker is CL-24™ available from Halliburton Energy Services, Inc., Duncan, Okla. An example of a suitable commercially available titanium-based crosslinker is CL-39™ available from Halliburton Energy Services, Inc., Duncan Okla. An example of a suitable commercially available boron based crosslinker is BC-140™ available from Halliburton Energy Services, Inc., Duncan Okla. Suitable crosslinkers generally are added to fracturing fluids in an amount sufficient to provide, among other things, the desired degree of crosslinking between gelling agent molecules. In certain embodiments of the present invention, the crosslinkers may be used in an amount in the range from about 0.001% to about 10% by weight of the water in the fracturing fluid. In other embodiments of the present invention, the crosslinkers may be used in an amount in the range from about 0.01% to about 1% by weight of the water therein. Individuals skilled in the art, with the benefit of this disclosure, will recognize the exact type and amount of crosslinker to use depending on factors such as the specific gelling agent, desired viscosity, and formation conditions.

The gelled or gelled and crosslinked fracturing fluids may also include internal delayed viscosity breakers such as enzymes, oxidizing agents, acid buffers, or temperature-activated viscosity breakers. The viscosity breakers may cause the viscous fluids to revert to thin fluids that can be produced back to the surface after they have been used to place proppant particulates in subterranean fractures. The viscosity breaker is typically used in the fracturing fluid in an amount in the range of from about 0.5% to about 10% by weight of the gelling agent. The fracturing fluids may also include one or more of a variety of well-known additives, such as gel stabilizers, fluid loss control additives, clay stabilizers, bactericides, and the like.

Once a fracture is provided, the first proppant particulate may be placed in the far-well bore portion of the fracture followed by the second proppant particulate in the near-well bore portion of the fracture. Any method of placing proppant particulates known in the art may be used to place the first proppant particulate into the far-well bore portion of the fracture and the second proppant particulate into the near-well bore portion of the fracture. Generally, suitable methods involve adding the proppant particulate to a fracturing fluid (described above) to form a slurry that is pumped into the fracture to prevent the fracture form closing when the pumping pressure is released. Once the first proppant particulate is placed in the far-well bore portion of the fracture the second proppant particulate may be placed in the near-well bore portion of the fracture so as to form a partial monolayer. Upon release of the fracturing pressure, a high porosity propped region in the near-well bore area should be formed.

Therefore, the present invention is well adapted to attain the ends and advantages mentioned as well as those that are inherent therein. While numerous changes may be made by those skilled in the art, such changes are encompassed within the spirit of this invention as defined by the appended claims.

What is claimed is:

1. A method comprising:
   providing a fracture in a portion of a subterranean formation having a far-well bore area and a near-well bore area;
   placing a portion of first proppant particulates at least partially coated with an adhesive substance in the far-well bore area of the fracture; and,
   placing a portion of second proppant particulates in the near-well bore area of the fracture so as to form a high porosity propped region in the near-well bore area, wherein a partial monolayer is formed by placing the portion of second proppant particulates to form spaced pillars capable of propping the fracture.

2. The method of claim 1 wherein the first proppant particulate comprises from about 40% by weight to about 90% by weight of the total proppant particulate used and wherein the first proppant particulate comprises at least one particulate selected from the group consisting of: a low-quality proppant particulate; a sand particulate; a bauxite particulate; a ceramic particulate; a glass particulate; a polymer particulate; a TEFLON® particulate; a nut shell particulate; a cured resinous particulate comprising nut shell pieces; a processed wood particulate; a composite particulate prepared from a binder with a filler particulate selected from the group consisting of silica, alumina, fumed carbon, carbon black, graphite, mica, titanium dioxide, a metasilicate, calcium silicate, kaolin, talc, zirconia, boron, and fly ash; a hollow glass microsphere, and a solid glass particulate.

3. The method of claim 1 wherein the adhesive substance comprises at least one adhesive substance selected from the group consisting of: a nonaqueous tackifying agent; an aqueous tackifying agent; a silyl-modified polyamide; a curable resin composition; and a combination thereof.

4. The method of claim 3 wherein the nonaqueous tackifying agent further comprises at least one multifunctional material selected from the group consisting of: an aldehyde; a dialdehyde; a glutaraldehyde; a hemiacetal; an aldehyde releasing compound; a diacid halide; a dihalide; a dichloride; a dibromide; a polyacid anhydride; citric acid; an epoxide; a furfuraldehyde condensate; a glutaraldehyde condensate; an aldehyde condensate; and a combination thereof.

5. The method of claim 3 wherein the aqueous tackifying agent comprises at least one aqueous tackifying agent selected from the group consisting of: a poly(methyl acrylate); a poly(butyl acrylate); a poly(2-ethylhexyl acrylate); a poly(methyl methacrylate); a poly(butyl methacrylate); a poly(2-ethylhexyl methacryate); an acrylic acid polymer; an acrylic acid ester polymer; an acrylic acid derivative polymer; an acrylic acid homopolymer; an acrylic acid ester homopolymer; an acrylic acid ester copolymer; a methacrylic acid derivative polymer; a methacrylic acid homopolymer; a methacrylic acid ester homopolymer; an acrylamido-methyl-propane sulfonate polymer; an acrylamido-methyl-propane sulfonate derivative polymer; an acrylamido-methyl-propane sulfonate copolymer; an acrylic acid/acrylamido-methyl-propane sulfonate copolymer; and a combination thereof.

6. The method of claim 3 wherein the curable resin comprises a curable resin selected from the group consisting of: a two-component epoxy-based resin; a glycidyl ether resin; a butoxymethyl butyl glycidyl ether resin; a novolak resin; a polyepoxide resin; a urea-aldehyde resin; a urethane resin; a polyurethane resin and a hybrid and a copolymer thereof; a phenolic resin; a phenol-aldehyde resin; a bisphenol A diglycidyl ether resin; a bisphenol A-epichlorohydrin resin; a phenol formaldehyde resin; a phenolic/latex resin; a furan resin; a furan/furfuryl alcohol resin; a polyester resin and a hybrid and a copolymer thereof; an acrylate resin; and a combination thereof.

7. The method of claim 1 wherein the second proppant particulate has a larger mesh size than the first proppant particulate.

8. The method of claim 1 wherein the partial monolayer is formed by placing nondegradable proppant particulates along with degradable particulates such that the degradable particulates degrade after placing the portion of second proppant particulates to form a high porosity propped fracture.

9. The method of claim 1 wherein the second proppant particulate comprises a substantially non-spherical particulate and wherein the substantially non-spherical particulate has an aspect ratio and a longest axis and where the longest axis is from about 0.02 inches to about 0.3 inches in length.

10. The method of claim 1 wherein the second proppant particulate comprises a high-quality proppant particulate.

11. The method of claim 1 wherein the second proppant particulate comprises at least one high density plastic and a reinforcing material.

12. The method of claim 1 wherein the second proppant particulate comprises nondegradable proppant particulates and degradable particles.

13. The method of claim 12 wherein the degradable particle comprises from about 10% to about 90% of the second proppant particulate.

14. The method of claim 1 wherein the fracture in the portion of the subterranean formation was formed by hydraulic fracturing.

15. A method comprising:
   providing a fracture in a portion of a subterranean formation having a far-well bore area and a near-well bore area;
   placing a portion of first proppant particulates at least partially coated with an adhesive substance in the far-well bore area of the fracture, wherein the adhesive substance comprises at least one adhesive substance selected from the group consisting of: a nonaqueous tackifying agent; an aqueous tackifying agent; a silyl-modified polyamide; and a combination thereof; and,
   placing a portion of second proppant particulates in the near-well bore area of the fracture so as to form a high porosity propped region in the near-well bore area, wherein the partial monolayer is formed by placing nondegradable proppant particulates along with degradable particulates such that the degradable particulates degrade after placing the portion of second proppant particulates to form a high porosity propped fracture.

16. The method of claim 15 wherein the first proppant particulate comprises from about 40% by weight to about 90% by weight of the total proppant particulate used and wherein the first proppant particulate comprises a low-quality particulate.

* * * * *